(12) United States Patent
Munakata et al.

(10) Patent No.: US 10,019,082 B2
(45) Date of Patent: Jul. 10, 2018

(54) POSITION POINTER, SIGNAL PROCESSING CIRCUIT, SIGNAL SUPPLY CONTROLLING METHOD AND SIGNAL PROCESSING METHOD

(71) Applicant: Wacom Co., Ltd., Saitama (JP)

(72) Inventors: Hiroshi Munakata, Saitama (JP); Yoshihisa Sugiyama, Saitama (JP)

(73) Assignee: WACOM CO., LTD., Saitama (JP)

( * ) Notice: Subject to any disclaimer, the term of this patent is extended or adjusted under 35 U.S.C. 154(b) by 49 days.

(21) Appl. No.: 15/016,199

(22) Filed: Feb. 4, 2016

(65) Prior Publication Data

US 2016/0246389 A1 Aug. 25, 2016

(30) Foreign Application Priority Data

Feb. 20, 2015 (JP) ................. 2015-031811

(51) Int. Cl.
*G06F 3/0354* (2013.01)
*G06F 3/038* (2013.01)

(52) U.S. Cl.
CPC ........ *G06F 3/0383* (2013.01); *G06F 3/03545* (2013.01)

(58) Field of Classification Search
CPC .................... G06F 3/03545; G06F 3/0383
See application file for complete search history.

(56) References Cited

U.S. PATENT DOCUMENTS

| | | | |
|---|---|---|---|
| 8,487,891 B2 | 7/2013 | Oda et al. | |
| 8,581,861 B2 | 11/2013 | Oda et al. | |
| 8,587,534 B2 | 11/2013 | Oda et al. | |
| 8,587,535 B2 | 11/2013 | Oda et al. | |
| 8,638,320 B2 | 1/2014 | Harley et al. | |

(Continued)

FOREIGN PATENT DOCUMENTS

| | | | |
|---|---|---|---|
| JP | 2011-003035 A | 1/2011 | |
| JP | 2011-003036 A | 1/2011 | |

(Continued)

OTHER PUBLICATIONS

Extended European Search Report, dated Oct. 25, 2016, for corresponding to EP Application No. 16156468.7-1972 / 3059665, 16 pages.

(Continued)

*Primary Examiner* — Charles Hicks
(74) *Attorney, Agent, or Firm* — Seed Intellectual Property Law Group LLP

(57) ABSTRACT

A position pointer includes a first electrode disposed so as to project from one end portion of a pen-shaped housing in an axial direction; a second electrode disposed in a proximity of the first electrode so as to surround a center axis of the pen-shaped housing; and a signal generation circuit which, in operation, generates a given signal. The signal generated by the signal generation circuit is outputted to a sensor provided in a position detection apparatus. The signal generation circuit, in operation, generates a signal of a first signal level and a signal of a second signal level lower than the first signal level. A signal supply controlling circuit, in operation, selectively supplies the signal of the first signal level and the signal of the second signal level generated by the signal generation circuit to the second electrode.

34 Claims, 13 Drawing Sheets

(56) References Cited

U.S. PATENT DOCUMENTS

| | | |
|---|---|---|
| 8,692,779 B2 | 4/2014 | Oda et al. |
| 8,896,547 B2 | 11/2014 | Oda et al. |
| 9,158,418 B2 | 10/2015 | Oda et al. |
| 9,235,288 B2 | 1/2016 | Yamamoto et al. |
| 2010/0170726 A1 | 7/2010 | Yeh et al. |
| 2010/0321313 A1 | 12/2010 | Oda et al. |
| 2010/0321314 A1 | 12/2010 | Oda et al. |
| 2010/0321315 A1 | 12/2010 | Oda et al. |
| 2010/0321331 A1 | 12/2010 | Oda et al. |
| 2010/0321332 A1 | 12/2010 | Oda et al. |
| 2010/0321333 A1 | 12/2010 | Oda et al. |
| 2010/0321334 A1 | 12/2010 | Oda et al. |
| 2011/0155479 A1 | 6/2011 | Oda et al. |
| 2012/0146940 A1 | 6/2012 | Yamamoto et al. |
| 2012/0256830 A1 | 10/2012 | Oda et al. |
| 2012/0327042 A1 | 12/2012 | Harley et al. |
| 2013/0106718 A1* | 5/2013 | Sundara-Rajan ....... G06F 3/038 345/173 |
| 2013/0106764 A1 | 5/2013 | Sundara-Rajan et al. |
| 2013/0249823 A1 | 9/2013 | Ahn et al. |
| 2014/0015811 A1 | 1/2014 | Ji et al. |
| 2014/0043301 A1 | 2/2014 | Katsurahira |
| 2014/0049478 A1 | 2/2014 | Brunet et al. |
| 2014/0078109 A1 | 3/2014 | Armstrong-Muntner |
| 2015/0035810 A1 | 2/2015 | Shahparnia et al. |
| 2016/0062492 A1 | 3/2016 | Geller et al. |

FOREIGN PATENT DOCUMENTS

| | | |
|---|---|---|
| JP | 2012-123599 A | 6/2012 |
| JP | 2014-035631 A | 2/2014 |

OTHER PUBLICATIONS

European Search Report, dated Jun. 28, 2016, for European Application No. 16156468.7-1972, 9 pages.

* cited by examiner

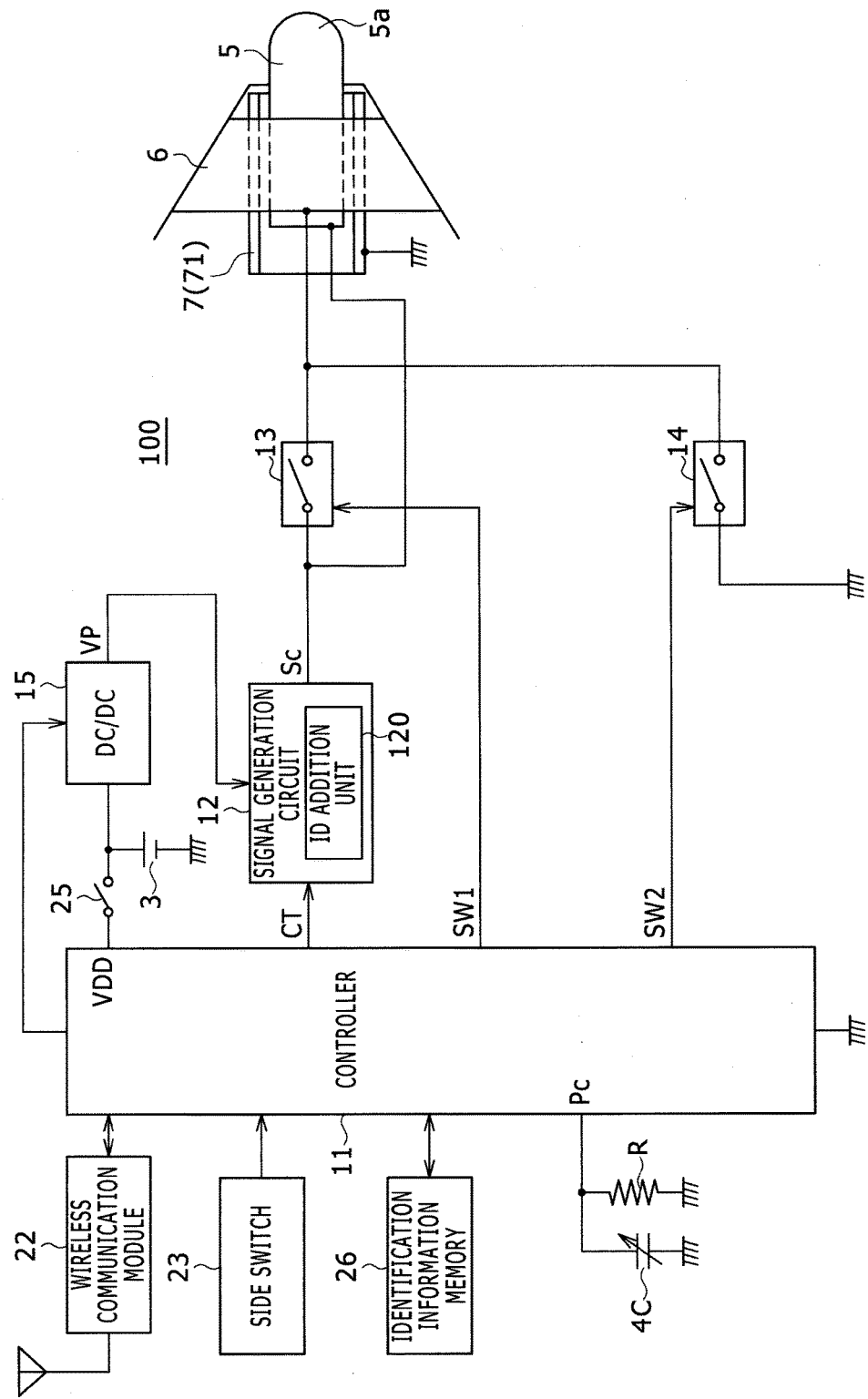

FIG.5A <HOVER MODE>

FIG.5B <POSITION INDICATION MODE>

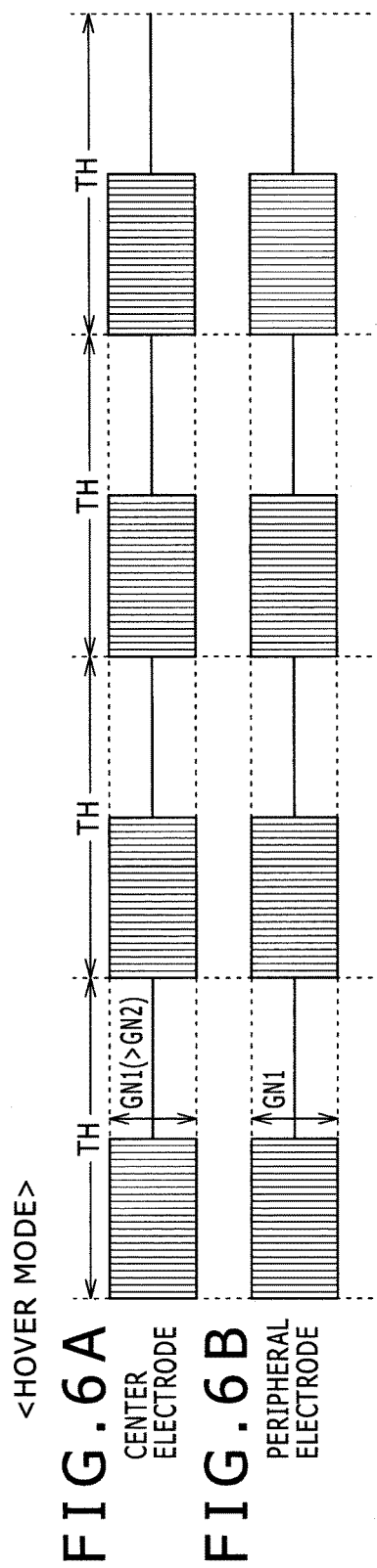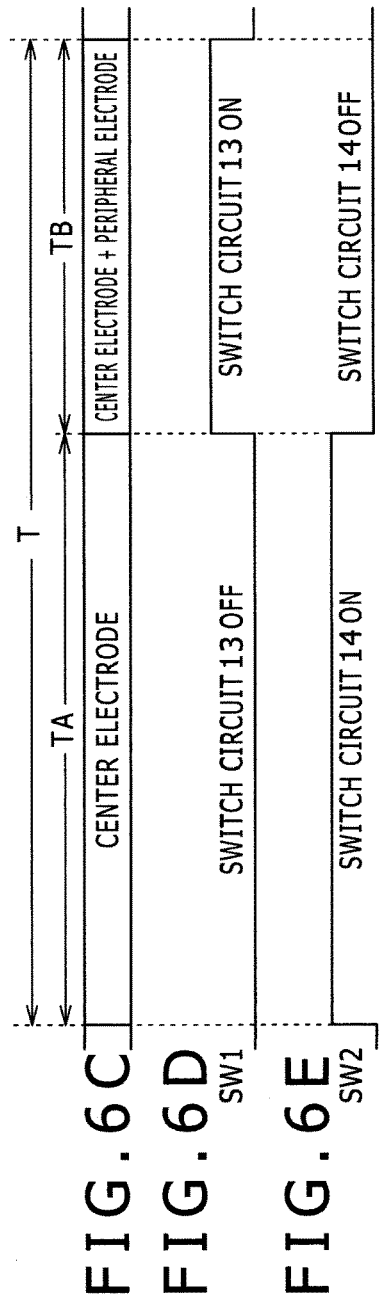

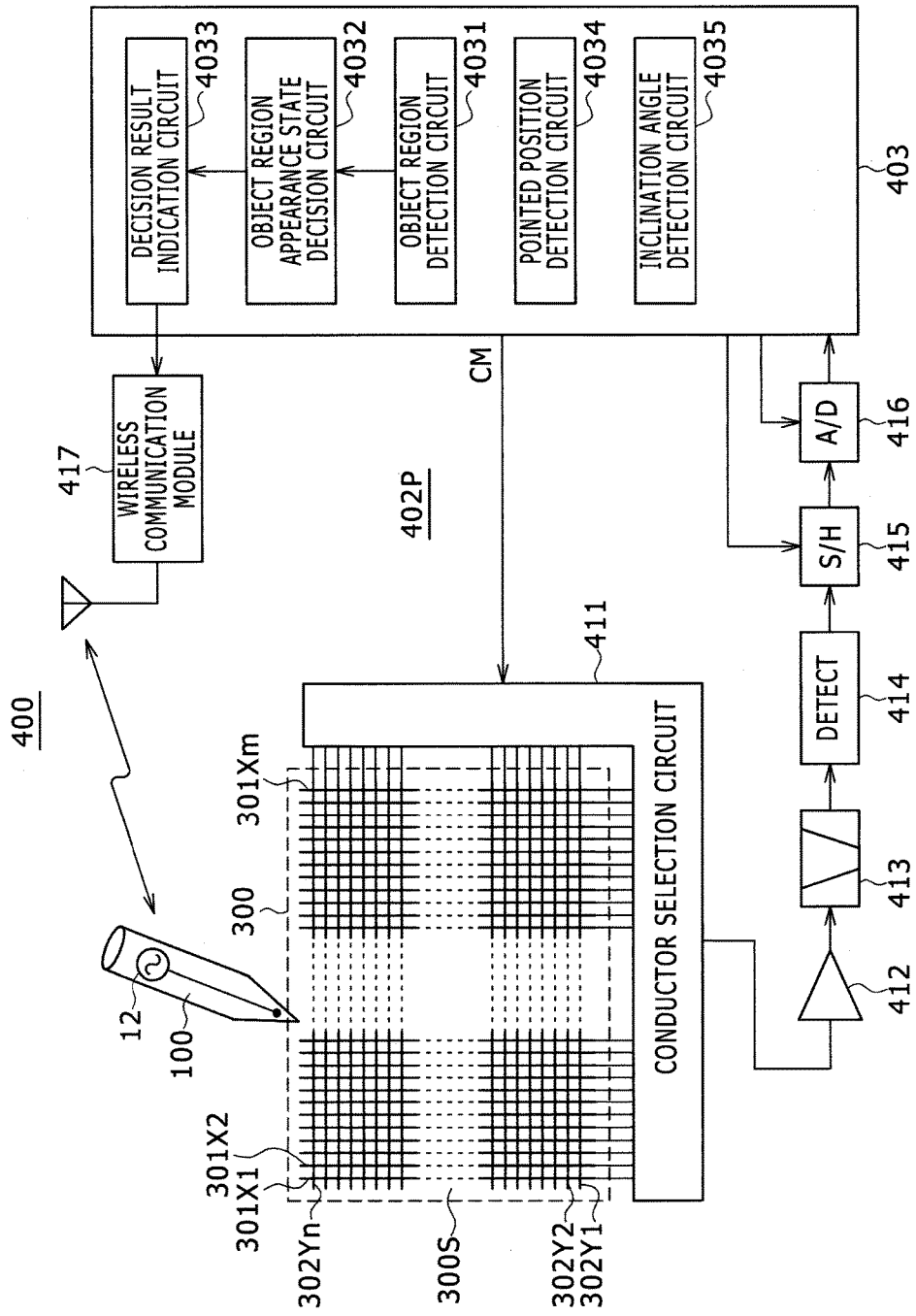

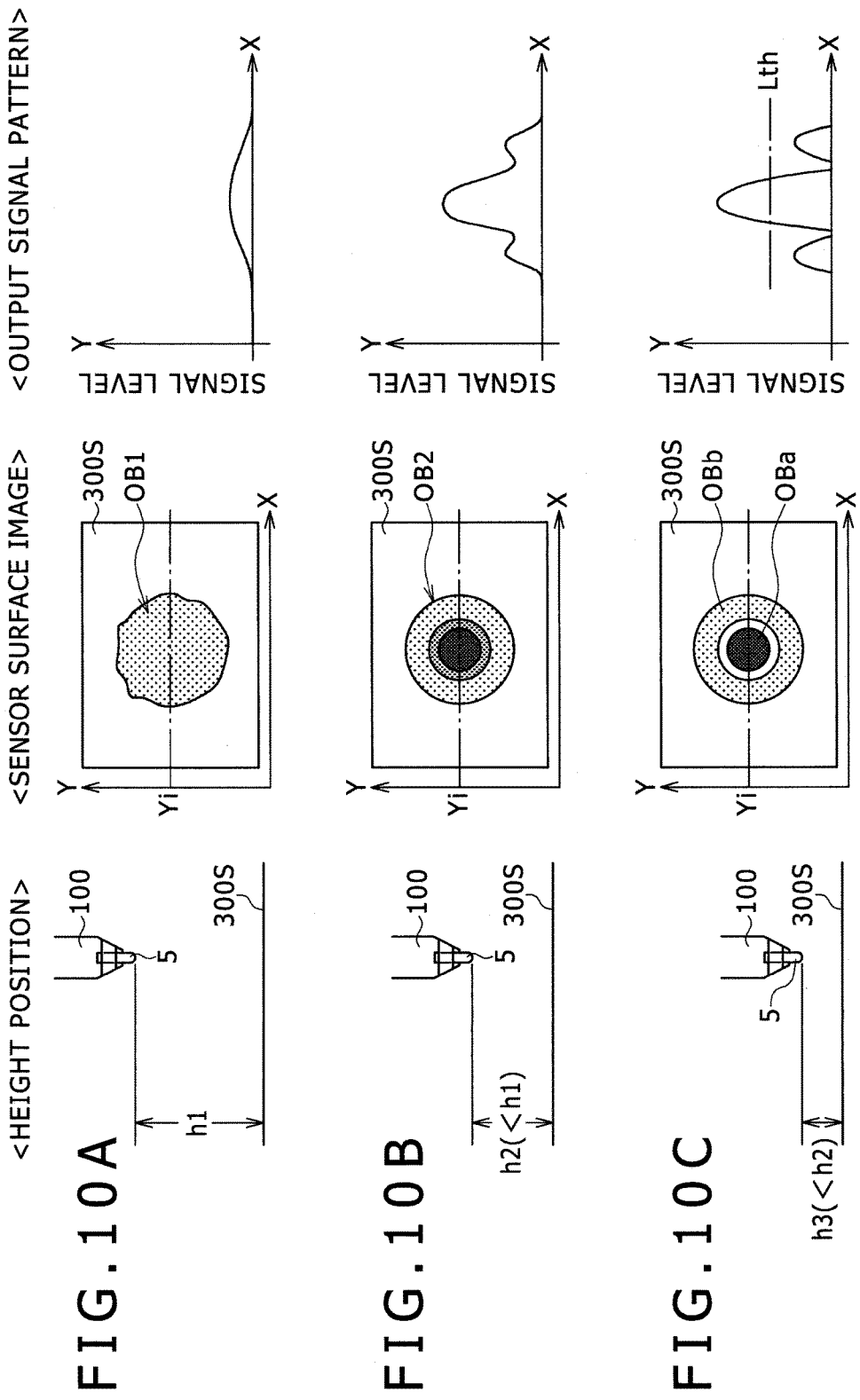

POSITION POINTER, SIGNAL PROCESSING CIRCUIT, SIGNAL SUPPLY CONTROLLING METHOD AND SIGNAL PROCESSING METHOD

BACKGROUND OF THE INVENTION

1. Field of the Invention

The present disclosure relates to a position pointer (stylus) having a shape of a pen and a signal processing circuit which capacitively detects the position pointer on a sensor. The present disclosure relates also to a signal supply controlling method for a position pointer and a signal processing method for capacitively detecting the position pointer on a sensor.

2. Description of the Related Art

A position detection apparatus such as a touch panel has come to be used widely, and various disclosures have been made for a position detection apparatus. Further, attention is paid to a position pointer called an active capacitive pen as a pointer used together with a position detection apparatus of a capacitance type. A type of an active capacitive pen is known which includes a driving power supply and an oscillator driven by the driving power supply, both provided in a housing, and in which an oscillation signal of the oscillator is outputted to a position detection apparatus. Also, another type of an active capacitive pen is known which receives a signal from a position detection apparatus and amplifies and outputs the signal to the position detection apparatus. A position detection apparatus receives a signal outputted from any of the position pointers of the types described and includes a sensor having first conductors of a first direction and second conductors of a second direction. The position detection apparatus detects a position pointed to by an active capacitive pen by receiving, at the first conductors of the first direction and the second conductors of the second direction of the sensor thereof, signals from the active capacitive pen through capacitive coupling (interaction with the capacitive pen).

For an active capacitive pen of the type described, it is demanded to input angle information such as an inclination angle of a position pointer as data in addiction to a coordinate value input.

In order to satisfy the demand, a technology which makes it possible to detect an inclination angle or the like of a position pointer on a sensor face of a position detection apparatus is proposed, for example, in Japanese Patent Laid-open No. 2014-35631 or U.S. Pat. No. 8,638,320 B2 (hereinafter, referred to as Patent Document 1 and Patent Document 2, respectively).

In Patent Document 1, in order to detect an inclination angle of a position pointer, a first electrode and a second electrode are provided on a core member, and an electrode from which an alternating current (AC) signal is to be outputted out is selected alternately from the first and second electrodes. Also, three electrodes are provided at an end portion on one side of a housing in such a manner as to surround a core member projecting from an opening of the housing, and an AC signal is supplied to one of the electrodes selected based on a pattern determined in advance.

Further, the position detection apparatus calculates an inclination angle or the like of the position pointer with respect to the sensor face from a plurality of coordinate positions or signal strengths on the sensor face which receives an AC signal from the position pointer. The coordinate positions are determined in accordance with pattern information received from the position pointer.

Meanwhile, in Patent Document 2, signals are supplied to tip electrodes (414 and 714) and an electrode (ring electrode 416) or electrodes (segment electrodes 716-A to 716-C) surrounding the tip electrode. Then, an inclination angle or the like of a position pointer (stylus) is detected at a touch panel from a reception pattern of a signal from the tip electrode and a reception pattern of a signal or signals from the surrounding electrode or electrodes.

Incidentally, an active capacitive pen of the type described is demanded to have a high performance. Particularly, it is demanded not only to detect angle information such as an inclination angle on a sensor face but also to detect an active capacitive pen also at a distance (height) spaced from the sensor face, namely, to assure a hovering distance (height) as great as possible. Also there is a demand to elongate the driving time period of an active capacitive pen by minimizing the power consumption.

In such a position detection apparatus of the capacitance type as is disclosed in Patent Documents 1 and 2, although an active capacitive pen is used, the position detection apparatus can merely detect the angle direction such as an inclination angle of the position pointer. However, both of the documents are silent of hovering and hence are silent of simultaneous improvement in hovering performance.

Meanwhile, an existing active capacitive pen outputs a same signal and uses a same outputting method irrespective of whether it is positioned in a spaced relationship from the sensor face of the position detection apparatus or positioned in the proximity of the sensor face. Besides, the existing active capacitive pen performs neither detection of angle information such as an inclination angle on the sensor face nor signal control which takes power consumption of the active capacitive pen into consideration.

SUMMARY OF THE INVENTION

In view of the problems described above, it is desirable to provide a position pointer which can assure the hovering distance above a sensor as great as possible taking long time driving or low power consumption into consideration. It is also desirable to provide a signal processing circuit which can detect also angle information such as an inclination angle on a sensor face.

According to an aspect of the present disclosure, there is provided a position pointer including a first electrode disposed so as to project from one end portion of a pen-shaped housing in an axial direction, a second electrode disposed in the proximity of the first electrode so as to surround a center axis of the pen-shaped housing, a signal generation circuit configured to generate a given signal, the signal generated by the signal generation circuit being outputted to a sensor provided in a position detection apparatus, the signal generation circuit being capable of generating a signal of a first signal level and a signal of a second signal level lower than the first signal level, and a signal supply controlling circuit configured to selectively supply the signal of the first signal level and the signal of the second signal level generated by the signal generation circuit to the second electrode.

According to another aspect of the present disclosure, there is provided a signal processing circuit for capacitively detecting a position pointer on a sensor to which the signal processing circuit is coupled, the sensor including a plurality of first conductors disposed in a first direction and a plurality of second conductors disposed in a second direction different from the first direction, the position pointer including a first electrode disposed so as to project from one end portion of a pen-shaped housing in an axial direction and a second electrode disposed so as to surround a center axis of the housing in the proximity of the first electrode, the position pointer including a signal generation circuit capable of generating a signal of a first signal level and a signal of a second signal level lower than the first signal level, a signal supply controlling circuit configured to selectively supply the signal of the first signal level and the signal of the second signal level both generated by the signal generation circuit to the second electrode, and a reception circuit configured to receive a signal generated by the signal processing circuit. The signal processing circuit includes a transmission circuit configured to supply a signal for controlling the signal supply controlling circuit provided in the position pointer through the reception circuit provided in the position pointer, the signal of the first signal level and the signal of the second signal level both generated by the signal generation circuit provided in the position pointer being selectively supplied to the second electrode through the signal supply controlling circuit.

In the position pointer of the present disclosure having the configuration described above, the first electrode is disposed so as to project from one end portion of the pen-shaped housing in the axial direction. Meanwhile, the second electrode is disposed in the proximity of the first electrode so as to surround the center axis of the pen-shaped housing. Further, the signal supply controlling circuit selectively supplies a signal of the first signal level and a signal of the second level lower than the first level from the signal generation circuit to the second electrode. Consequently, it is possible to satisfy requirements for such advanced features as a position detection process, detection of the inclination angle and detection of a hover state on the reception side.

For example, in the hover state, the signal supply controlling circuit supplies a first signal of a signal level higher than the second signal level to the second electrode. Consequently, on the position detection apparatus side, a signal from the position pointer can be received with an increased signal strength, and the hover state (hovering distance) of the position pointer can be detected with a high sensitivity.

On the other hand, when the position pointer is positioned in the proximity of or in contact with the sensor, if a signal of the second level is supplied to the second electrode, then the sensor side receives the signal from the second electrode in a pattern corresponding to the inclination angle of the position pointer. Therefore, the inclination angle of the position pointer can be detected on the sensor side.

Further, the signal supply controlling circuit carries out the signal supply control such that, in the hover state, the first signal having a higher signal level is supplied to the second electrode whereas, when the position or the inclination angle of the position pointer is to be detected, a signal of the second signal level lower than that of the first signal is supplied to the second electrode. Consequently, the power consumption is reduced, and therefore, a configuration suitable for a battery-driven position pointer can be provided.

With the present disclosure, a position pointer can be provided which satisfies requirements for such advanced features as a position detection process, detection of the inclination angle and detection of a hover state on the reception side while suppressing the power consumption. Further, a signal processing circuit can be provided which can detect angle information such as an inclination angle of the position pointer on the sensor or a hover state or a state of the pointed position by the position pointer in the hover state with a high sensitivity.

BRIEF DESCRIPTION OF THE DRAWINGS

FIG. 3 is a block diagram depicting an example of a configuration of a signal processing circuit of the position pointer depicted in FIGS. 2A and 2B;

FIGS. 5A to 5E are timing charts illustrating an example of processing operation of the major part of the position pointer depicted in FIGS. 2A and 2B;

FIGS. 6A to 6E are timing charts illustrating an example of processing operation of the major part of the position pointer depicted in FIGS. 2A and 2B;

FIG. 9 is a block diagram depicting an example of a configuration of a signal processing apparatus used together with the position pointer depicted in FIGS. 2A and 2B;

FIGS. 10A to 10C are schematic views illustrating processing operation of the major part of the signal processing apparatus used together with the position pointer depicted in FIGS. 2A and 2B;

DETAILED DESCRIPTION OF THE PREFERRED EMBODIMENTS

In the following, a position pointer and a position detection apparatus according to several embodiments of the present disclosure are described with reference to the accompanying drawings.

First Embodiment

Figure 1:
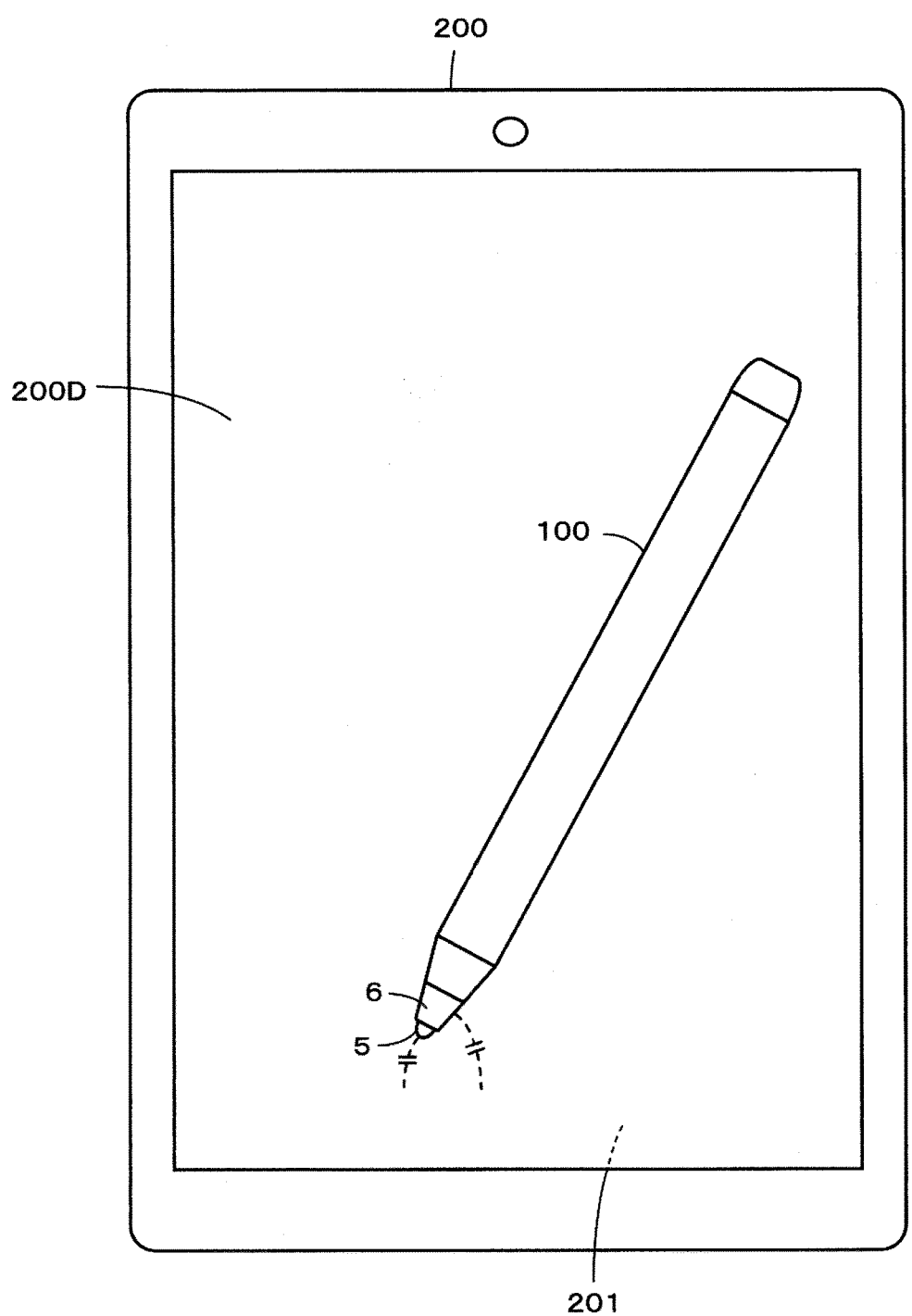
FIG. 1 is a view schematically depicting an embodiment of a position pointer according to the present disclosure together with an electronic apparatus including a position detection apparatus.

FIG. 1 depicts an example of a tablet type information terminal 200 as an example of an electronic apparatus which uses a position pointer 100 according to an embodiment of the present disclosure. In the example depicted, the tablet type information terminal 200 includes a display screen 200D of a display unit such as, for example, a liquid crystal display (LCD). The tablet type information terminal 200 further includes a position detection apparatus 201 of the capacitive type at an upper portion (front face side) of the display screen 200D.

A user would point to a position on a sensor of the position detection apparatus 201 of the tablet type information terminal 200 using a pointer such as the position pointer 100 or a finger. The position detection apparatus 201 detects the pointed position on the sensor of the position detection apparatus 201 by the position pointer 100 or a finger and detects angle information such as an inclination angle of the position pointer 100 at the pointed position.

[Example of Mechanical Configuration of Position Pointer 100 of Embodiment]

Figure 2A:
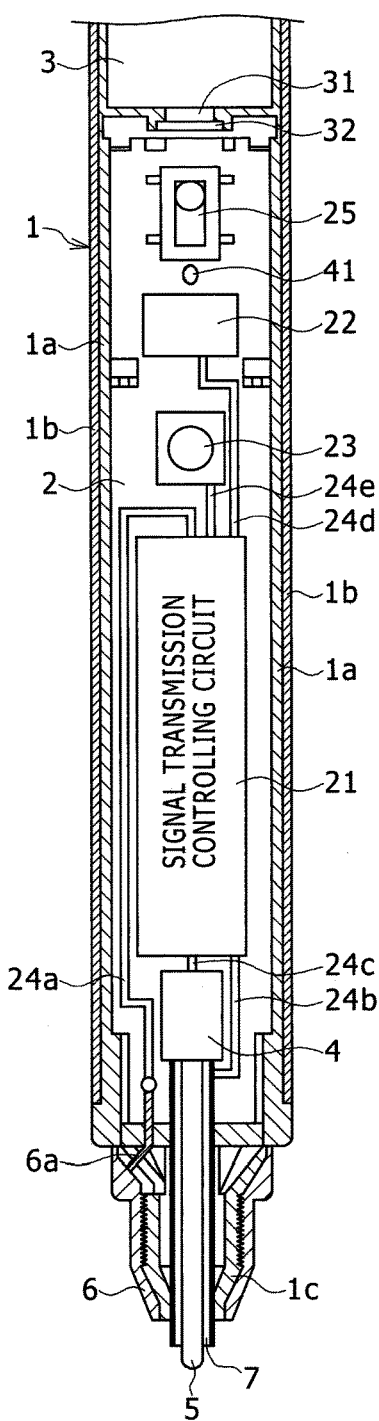
FIGS. 2A and 2B are a cross sectional view and a side elevational view, respectively, depicting an example of a mechanical configuration of a first embodiment of the position pointer according to the present disclosure.
Figure 2B:
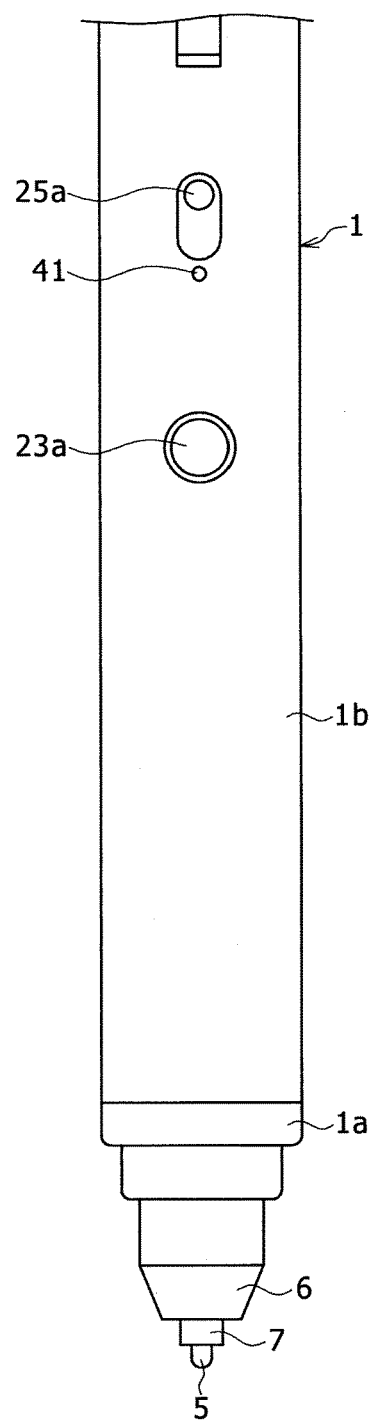

FIGS. 2A and 2B depict an example of a mechanical configuration of the position pointer 100. The position pointer 100 of the embodiment includes a housing 1 having an appearance of a shape of a pen (bar-like stylus shape). FIG. 2A depicts a cross section of the inside of the housing 1 with part of the housing 1 broken. FIG. 2B depicts an outer appearance of the position pointer 100.

As depicted in FIG. 2A, the housing 1 is configured from an insulator portion 1a of a hollow cylindrical shape made of an insulating material for example, a synthetic resin. In the present embodiment, the outer peripheral face of the insulator portion 1a of the housing 1 is covered at least at a portion thereof at which an operator would grasp the position pointer 100 with a conductor portion 1b made of, for example, a metal.

In the housing 1, a printed circuit board 2, a battery 3 and a tool force detection module 4 are disposed as depicted in FIG. 2A. Though not depicted, the conductor portion 1b which covers the outer peripheral face of the housing 1 is electrically coupled to a grounding conductor of the printed circuit board 2.

As depicted in FIG. 2A, a signal transmission controlling circuit 21, a wireless communication module 22, a side switch 23 configured from a pushbutton switch 23a and conductor patterns 24a to 24e are disposed on the printed circuit board 2. Further, in the example depicted, a power supply switch 25, a light emitting diode (LED) 41 and so forth are disposed on the printed circuit board 2. It is to be noted that, although each of the conductor patterns 24a to 24e in FIG. 2A is schematically indicated as a single conductor pattern for simplified illustration, naturally each of the conductor patterns 24a to 24e may be configured from a plurality of conductor patterns as occasion demands.

The battery 3 supplies power to electronic circuits and electronic parts configured on the printed circuit board 2 and is configured from a dry cell battery, a rechargeable battery, a capacitor or the like. The tool force detection module 4 is configured, in the present embodiment, as a variable capacitor which demonstrates a capacitance corresponding to a tool force applied to a center electrode 5 which configures a core member.

The wireless communication module 22 in the present embodiment is configured as a wireless communication module of the Bluetooth (registered trademark) standard which is a near field communication standard. The wireless communication module 22 is coupled to the signal transmission controlling circuit 21. It is to be noted that the wireless communication module 22 is not limited to that of the Bluetooth type and may otherwise be a wireless communication module, for example, of the Wi-Fi (registered trademark) standard. Otherwise, wireless communication which uses infrared communication or optical communication may be applied.

The side switch 23 supplies on-off information thereof as an example of additional information to the signal transmission controlling circuit 21. The variable capacitor configured from the tool force detection module 4 demonstrates a capacitance variation corresponding to a tool force applied to the center electrode 5 configuring the core member. The signal transmission controlling circuit 21 generates tool force information as an example of additional information on the basis of the capacitance. The center electrode 5 is an example of a first electrode.

It is to be noted that, though not depicted in FIGS. 2A and 2B, in the present embodiment, the position pointer 100 has self or own identification (ID) information and supplies also the identification information as additional information to the position detection apparatus.

In the present embodiment, the battery 3 is accommodated in the housing 1 in such a manner as depicted in FIG. 2A and generates a driving voltage to the electronic circuit elements such as the signal transmission controlling circuit 21 on the printed circuit board 2. In FIG. 2A, a terminal 32 is electrically coupled to the electronic circuit elements on the printed circuit board 2. A positive side electrode 31 of the battery 3 is electrically coupled to the terminal 32. Though not depicted, the negative side electrode of the battery 3 is coupled directly to a grounding conductor of the printed circuit board 2 or is coupled to the grounding conductor of the printed circuit board 2 through the conductor portion 1b of the housing 1.

The power supply switch 25 disposed on the printed circuit board 2 has an operation piece 25a provided for operation from the outside through an opening perforated in the housing 1 as depicted in FIG. 2B. A user can switch the power supply switch 25 between on and off by slidably moving the operation piece 25a.

One end portion side in the direction of a center line of the insulator portion 1a of a hollow cylindrical shape configuring the housing 1 is formed as a tapering portion 1c which is tapering gradually as depicted in FIG. 2A. A peripheral electrode 6 formed from a conductor metal member, for example, of an annular shape is attached to an outer peripheral side of the tapering portion 1c. The peripheral electrode 6 is an example of a second electrode. The peripheral electrode 6 and the conductor portion 1b on the peripheral face of the housing 1 are electrically isolated from each other by the insulator portion 1a (including the tapering portion 1c) interposed therebetween.

The peripheral electrode 6 is capacitively coupled to the sensor of the position detection apparatus 201 as schematically illustrated in FIG. 1 to transmit, in the present embodiment, a signal to the position detection apparatus 201. The peripheral electrode 6 is electrically coupled to a conductor pattern 24a of the printed circuit board 2 by a lead conductor member 6a extending through the insulator portion 1a. The conductor pattern 24a is coupled, in the present example, to an input terminal of the signal transmission controlling circuit 21.

Further, in the present embodiment, the center electrode 5 formed from a bar member having a conductivity is disposed such that it is exposed on one end side thereof to the outside from the hollow portion of the tapering portion 1c of the housing 1. The center electrode 5 forms a core member which configures a pen tip of the position pointer 100 of a shape of a pen.

The center electrode 5 in the present embodiment outputs a position indication signal. An end portion of the center electrode 5 on the opposite side to the side on which the center electrode 5 projects to the outside is configured so as to be electrically coupled to a conductor pattern 24b formed on the printed circuit board 2. The conductor pattern 24b is coupled to an output terminal of the signal transmission controlling circuit 21.

The peripheral electrode 6 is provided around the center electrode 5. In the present embodiment, a shield member (shield electrode) 7 is provided between the peripheral electrode 6 and the center electrode 5 so that electric interference between the peripheral electrode 6 and the center electrode 5 may be prevented efficiently. The shield member 7 of the embodiment is provided so as to surround the center electrode 5. Consequently, the shield member 7 is interposed between the peripheral electrode 6 and the central electrode 5 to decrease the capacitive coupling capacitance between the peripheral electrode 6 and the center electrode 5 as far as possible.

The center electrode 5 as the core member is locked in the hollow portion of the housing 1 of the position pointer 100 by fitting at the end portion thereof on the opposite side to the outwardly projecting side with the tool force detection module 4 disposed in the hollow portion of the housing 1. It is to be noted that, as hereinafter described, the center electrode 5 is configured such that the fitting thereof with the tool force detection module 4 is cancelled by pulling off the center electrode 5. In other words, the center electrode 5 as the core member is exchangeable with respect to the housing 1.

The tool force detection module 4 configures, in the present example, an example of a pressure detection circuit for detecting a pressure (tool force) applied to the center electrode 5 as the core member. In the present example, the tool force detection module 4 is configured from a variable capacitor which demonstrates a capacitance corresponding to the pressure (tool force) applied to the center electrode 5. The variable capacitor configured from the tool force detection module 4 is coupled at the electrode on the opposite end thereof to the signal transmission controlling circuit 21, in FIG. 2A, by a conductor pattern 24c.

The signal transmission controlling circuit 21 determines, in the present embodiment, on the basis of information received from the position detection apparatus 201 through the wireless communication module 22, whether the mode of the position pointer 100 is to be set to a hover mode or to a position indication mode hereinafter described. Further, the signal transmission controlling circuit 21 controls outputting of a signal through the peripheral electrode 6 and controls the signal level of a signal to be outputted on the basis of the determination.

[Example of Configuration of Signal Processing Circuit of Position Pointer 100]

FIG. 3 is a block diagram depicting an example of a configuration of the signal processing circuit including the signal transmission controlling circuit 21 of the position pointer 100 of the first embodiment. In particular, the signal processing circuit of the position pointer 100 includes a controller 11, a battery 3 such as a rechargeable secondary battery as a driving power supply, a signal generation circuit 12, a switch circuit 13, another switch circuit 14 and a direct current (DC)/DC converter 15 for generating a plurality of voltages of different signal levels as depicted in FIG. 3. To the controller 11, the wireless communication module 22, the side switch 23, an identification information memory 26 which retains identification information therein, a variable capacitor 4C configuring the tool force detection module 4 and so forth are coupled. Identification information for identifying position pointers allocated to the position pointer 100 from each other are stored in the identification information memory 26.

When the operation piece 25a is slidably moved to switch on the power supply switch 25, a voltage of the battery 3 is applied as a power supply voltage VDD to the controller 11 as depicted in FIG. 3.

The controller 11 is configured, for example, from a microprocessor and configures a control circuit for controlling such processing operation as hereinafter described of the position pointer 100. To the controller 11, the power supply voltage VDD is supplied from the battery 3 as an example of a driving power supply. The controller 11 has functions of a signal supply controlling circuit, and controls the switch circuit 13 and the switch circuit 14 individually between on and off states. Further, the controller 11 monitors the capacitance variation of the variable capacitor 4C to detect the tool force applied through the center electrode 5 as the core member of the position pointer 100. In the present embodiment, the controller 11 detects the tool force from the discharge time period of the variable capacitor 4C as hereinafter described.

The signal generation circuit 12 includes, in the present first embodiment, an oscillation circuit which generates an AC signal of a predetermined frequency f1, for example, the predetermined frequency f1=1.8 MHz. The controller 11 supplies a control signal CT to the oscillation circuit which configures the signal generation circuit 12 to control the oscillation circuit between on and off. Accordingly, the oscillation circuit which configures the signal generation circuit 12 disconnects the generating AC signal in accordance with the control signal CT from the controller 11, and the signal generation circuit 12 thereby generates a signal Sc formed from an amplitude shift keying (ASK) modulation signal. In particular, the oscillation circuit configuring the signal generation circuit 12 is controlled by the controller 11 so that the signal generation circuit 12 generates an ASK modulation signal. As the signal to be generated by the signal generation circuit 12, the ASK modulation signal may be replaced by an on off keying (OOK) modulation signal, an frequency shift keying (FSK) modulation signal or any other modulation signal.

Further, in the present embodiment, the controller 11 controls the signal generation circuit 12 with the ASK modulation signal to add, to an output signal, ID information for identifying a selection state of the center electrode 5 configuring the core member and the peripheral electrode 6. In particular, the signal generation circuit 12 includes an ID addition unit 120 as a function thereof. Further, the signal generation circuit 12 generates a signal Sc as the ASK modulation signal under the control of the control signal CT from the controller 11. The signal Sc includes a continuous transmission signal (burst signal) not only for allowing the position detection apparatus 201 to detect the position pointed to by the position pointer 100 but also for allowing the position detection apparatus 201 to carry out signal demodulation in synchronism with a signal outputting timing of a signal to be outputted from the position pointer 100 and necessary additional information.

The signal Sc from the signal generation circuit 12 is amplified by an amplifier not depicted and then, in the present embodiment, is supplied to the center electrode 5 configuring the core member of the position pointer 100 and supplied to the peripheral electrode 6 through the switch circuit 13. The switch circuit 13 is controlled between on and off by a changeover controlling signal SW1 from the controller 11. Consequently, the signal Sc from the signal generation circuit 12 is selectively supplied to the peripheral electrode 6.

Further, the peripheral electrode 6 is coupled, in the present embodiment, to the ground through the switch circuit 14. The switch circuit 14 is controlled between on and off by a changeover controlling signal SW2 from the controller 11. In particular, the switch circuit 14 is controlled such that, when the signal Sc is not supplied to the peripheral electrode 6, the peripheral electrode 6 is coupled, for example, to the ground (for example, to the grounding conductor of the printed circuit board 2). In this case, the changeover controlling signal SW2 has a phase opposite to that of the changeover controlling signal SW1. In particular, when the signal Sc is supplied to the peripheral electrode 6, the switch circuit 13 is on and the switch circuit 14 is off, but when the signal Sc is not supplied to the peripheral electrode 6, the switch circuit 13 is off and the switch circuit 14 is on.

Consequently, the sensor of the position detection apparatus 201 is capacitively coupled to the center electrode 5 and/or the peripheral electrode 6 to which the signal Sc is supplied. Consequently, a bad influence of the peripheral electrode 6 when the signal Sc is not supplied thereto is prevented thereby to facilitate identification of signals from the center electrode 5 and the peripheral electrode 6.

It is to be noted that the switch circuit 14 may not be provided and the peripheral electrode 6 may be placed into a floating state when the switch circuit 13 is off and the signal Sc is not supplied to the peripheral electrode 6.

The DC/DC converter 15 can generate a signal VP of a plurality of signal levels by boosting the voltage of the battery 3. The signal VP of the plurality of signal levels is supplied from the DC/DC converter 15 to the signal generation circuit 12. In the present embodiment, the DC/DC converter 15 is controlled by the controller 11 to generate an output voltage VP of two different signal levels such as, for example, 9 V and 30 V. The signal level of the signal outputted from the signal generation circuit 12 depends upon the output voltage VP. It is to be noted that, in order to variably control the signal level of the signal to be outputted from the signal generation circuit 12, the controller 11 may control the DC/DC converter 15 to vary the output voltage VP. The signal generation circuit 12 receives the voltage VP having the plurality of levels in this manner as the driving voltage so that the signal Sc has a signal level corresponding to the voltage VP.

The controller 11 controls communication between the position pointer 100 and the position detection apparatus 201 by wireless communication through the wireless communication module 22. In the present example, the controller 11 controls the wireless communication module 22 to transmit on-off information of the side switch 23 and identification information allocated to the position pointer 100 from the identification information memory 26 to the position detection apparatus 201.

Further, the controller 11 receives a mode instruction signal transmitted thereto from the position detection apparatus 201 through the wireless communication module 22 and representative of a hover mode or a position indication mode. The controller 11 changes over the mode of the position pointer 100 between the hover mode and the position indication mode on the basis of the mode instruction signal transmitted from the position detection apparatus 201 to carry out outputting of the AC signal from the position pointer 100. Setting operation for the mode changeover for the AC signal outputting control of the position pointer 100 by the controller 11 is described below.

<Example of Processing Operation of Position Pointer 100>

The controller 11 of the position pointer 100 of the first embodiment performs, in a state in which the power supply switch 25 is on and power is supplied to the controller 11, mode changeover setting operation of the position pointer 100 on the basis of wireless communication with the position detection apparatus 201 to carry out outputting control of an AC signal.

Figure 4:
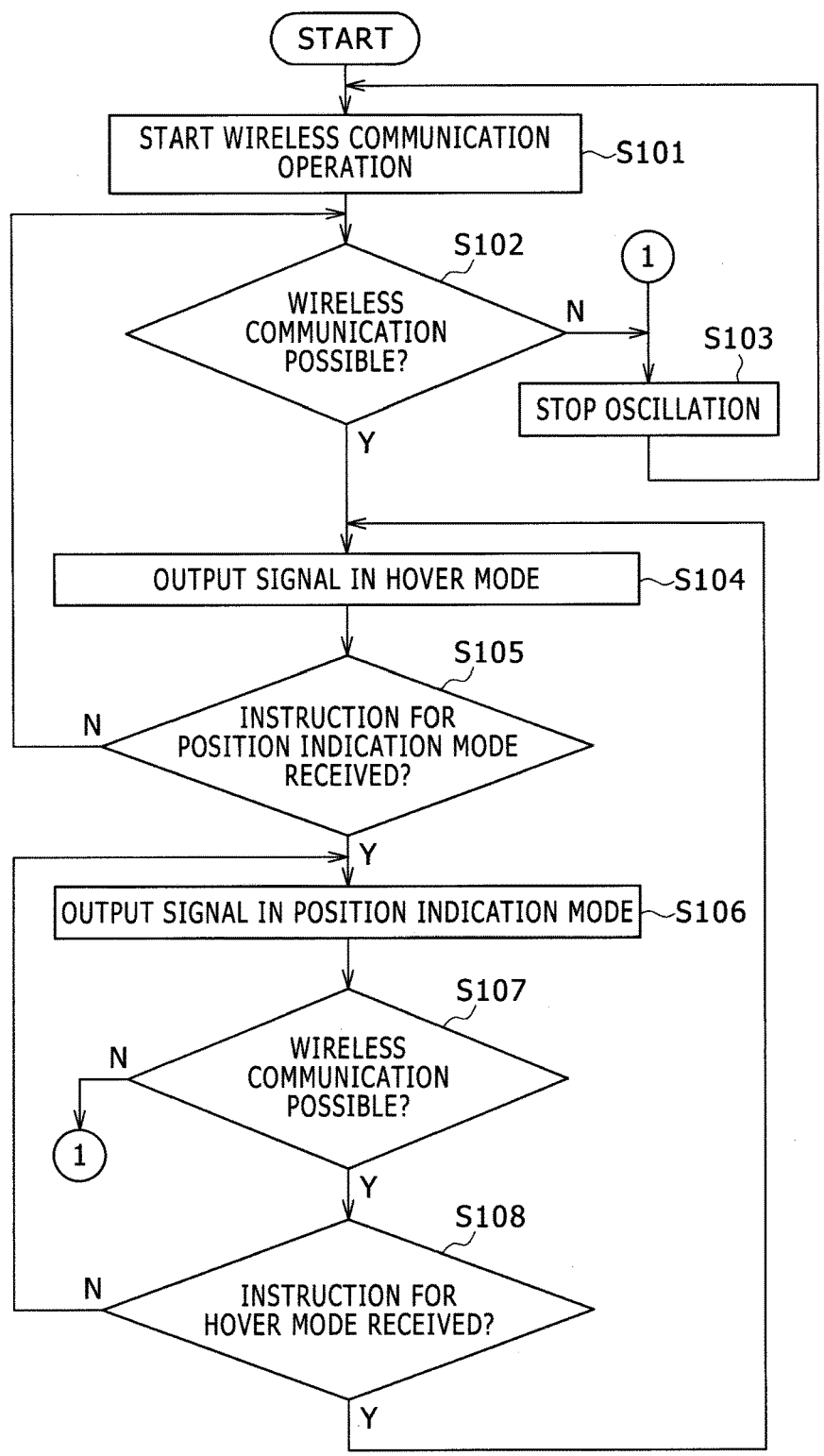
FIG. 4 is a flow chart illustrating a flow of an example of processing operation of a major part of the position pointer depicted in FIGS. 2A and 2B.

FIG. 4 is a flow chart illustrating an example of a flow of changeover setting operation for AC signal setting of the position pointer 100 of the first embodiment by the controller 11. FIGS. 5A to 6E are time charts illustrating operation of the position pointer 100.

In the present embodiment, if the power supply switch 25 of the position pointer 100 is turned on, then a power supply voltage is supplied to the wireless communication module 22 so that wireless communication operation is performed with the position detection apparatus 201 through the wireless communication module 22 (step S101). Consequently, the controller 11 decides whether or not wireless communication thereof with the position detection apparatus 201 is possible (step S102). If it is decided that wireless communication with the position detection apparatus 201 is not possible, then the controller 11 does not output the signal Sc in order to stop oscillation operation of the oscillation circuit configuring the signal generation circuit 12 (step S103). Then, the controller 11 returns its processing to step S101 so that the processes at the steps beginning with step S101 are repeated.

On the other hand, if it is decided at step S102 that wireless communication with the position detection apparatus 201 is possible, then the controller 11 sets the position pointer 100 to a signal outputting state in the hover mode (step S104).

In the hover mode, the controller 11 carries out signal outputting control in the following manner. In particular, it controls the wireless communication module 22 to transmit identification information of the position pointer 100 and on-off information of the side switch 23 to the position detection apparatus 201 by wireless transmission. Further, the controller 11 controls the wireless communication module 22 to transmit an AC signal generated by the signal generation circuit 12 to the sensor of the position detection apparatus 201 from both of the center electrode 5 and the peripheral electrode 6 (refer to FIG. 5A).

In this hover mode, the controller 11 controls the switch circuit 13 to turn on in accordance with the changeover controlling signal SW1 and controls the switch circuit 14 to turn off in accordance with the changeover controlling signal SW2. Then, the controller 11 intermittently drives the oscillation circuit, which configures the signal generation circuit 12, in accordance with the control signal CT to intermittently output the signal Sc in a burst state as depicted in FIGS. 6A and 6B from the center electrode 5 and the peripheral electrode 6.

The processes in the hover mode are different from processes in the position indication mode when the position pointer 100 contacts with the sensor face of the position detection apparatus 201 to point to a particular position. In particular, the processes in the hover mode are those for detecting a state in which the position pointer is positioned in the proximity of the sensor of the position detection apparatus 201 (namely, in a hover state) with a high sensitivity by the position detection apparatus 201. In the process of the hover mode, an AC signal from the position pointer 100 is outputted, in place of being outputted only from the center electrode 5, simultaneously from both of the center electrode 5 and the peripheral electrode 6 to increase the outputting energy of the AC signal. Consequently, detection of the AC signal from the position pointer 100 by the sensor of the position detection apparatus 201 is facilitated.

Figures 5A, 5B, 5C, 5D, 5E:
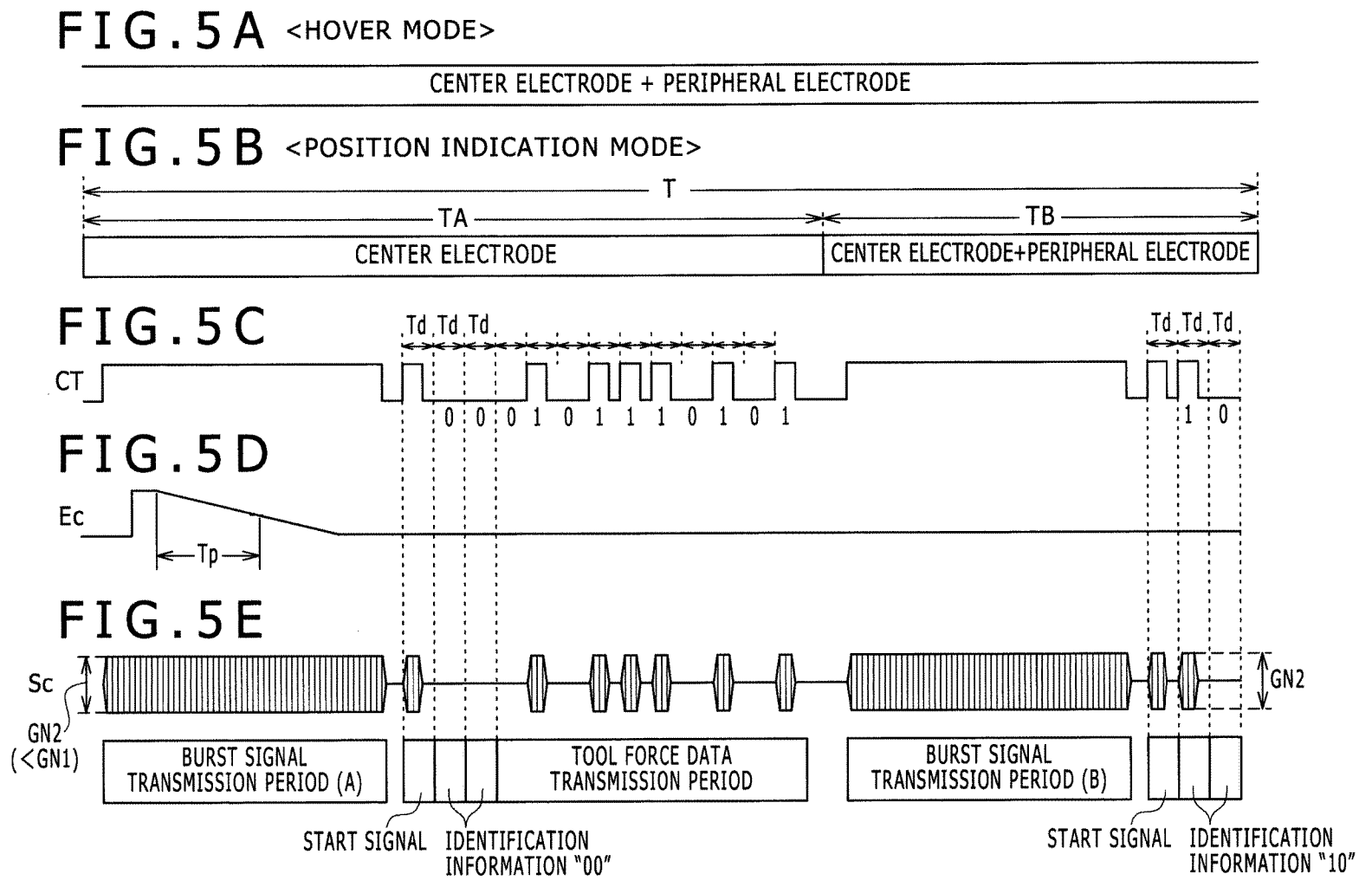

Further, in the hover mode, the controller 11 controls the DC/DC converter 15 to set the voltage VP to a higher voltage level, for example, to 30 V thereby to set the signal level of the signal Sc to be outputted from the signal generation circuit 12 to a first signal level GN1 (refer to FIGS. 6A and 6B) higher than a second signal level GN2 (refer to FIG. 5E). Further, the controller 11 controls the duty ratio of the signal outputting period of the signal Sc in a period TH of the signal Sc to be outputted from the signal generation circuit 12 in the hover mode so that the signal Sc is outputted intermittently. In the present example, the time-averaged power consumption may be equal to that upon outputting of the signal Sc whose signal level is set to the second signal level lower than the first signal level in the position indication mode hereinafter described. In particular, when the signal Sc is outputted with a high signal level, an intermittent signal is outputted in a short period of time thereby to prevent increase of the power consumption.

By outputting an AC signal from both of the center electrode 5 and the peripheral electrode 6 and increasing the signal level of the signal Sc to a higher level in this manner, even when the position pointer 100 is positioned at a position above the sensor face (hover state) spaced from the sensor face of the position detection apparatus 201, the signal Sc outputted from the position pointer 100 can be detected with a high sensitivity. Further, by setting the duty ratio of the signal outputting period of the signal Sc in the period TH to a low value in a corresponding relationship to setting of the signal level to a high level, the power consumption is suppressed.

It is to be noted that, in the foregoing description, in the hover mode, the signal Sc is outputted from both of the center electrode 5 and the peripheral electrode 6 in each period TH. However, the AC signal may otherwise be supplied only to the peripheral electrode 6 as depicted in FIG. 6B without supplying the AC signal to the center electrode 5. Further, where the remaining power capacity of the driving power supply such as a battery comes to be restricted, the AC signal may be supplied only to the center electrode 5.

If the position detection apparatus 201 receives the signal Sc from the position pointer 100 set to the hover mode, then it detects whether or not the tip end 5a of the center electrode 5 as the core member of the position pointer 100 comes to a close distance determined in advance from the sensor face of the position detection apparatus 201, for example, to a close distance smaller than 1 cm. Then, if the position detection apparatus 201 decides that the position pointer 100 is not in a close state, then it transmits a setting instruction of the hover mode to the position pointer 100 by wireless transmission. If the position detection apparatus 201 decides that the position pointer 100 is in a close state, then it transmits a setting instruction of the position indication mode (changing instruction to the position indication mode) to the position pointer 100 by wireless transmission.

It is to be noted that, as hereinafter described, in the present embodiment, after the position detection apparatus 201 issues a mode setting instruction to the position pointer 100, even if the position pointer 100 is spaced away so as to go out from the close state for a short period of time equal to or shorter than a predetermined period of time (for example, five seconds), the position detection apparatus 201 does not immediately transmit a mode changing instruction to the hover mode to the position pointer 100. This is because it is considered that such a short period of time equal to or shorter, for example, than five seconds represents a will of the user to continuously carry out an inputting operation for position pointing by the position pointer 100. In other words, the mode change from the hover mode to the position indication mode is carried out immediately whereas the mode changeover from the position indication mode to the hover mode is performed after a predetermined period of time provided as a changeover hysteresis.

The controller 11 of the position pointer 100 having been placed into the AC signal outputting state in the hover mode at step S104 monitors the signal from the position detection apparatus 201 received by the wireless communication module 22 to decide whether or not an instruction for the position indication mode is received from the position detection apparatus 201 (step S105).

If an instruction for the position indication mode is not received at step S105, then the controller 11 returns the processing to step S102, at which it decides whether or not wireless communication through the wireless communication module 22 is possible. If such wireless communication is possible, then the controller 11 maintains the signal outputting state in the hover mode.

On the other hand, if an instruction for the position indication mode is received at step S105, then the controller 11 changes over the position pointer 100 immediately to the signal outputting state in the position indication mode (step S106).

Also in this position indication mode, the controller 11 controls the wireless communication module 22 to transmit identification information of the position pointer 100 and on-off information of the side switch 23 to the position detection apparatus 201 by wireless transmission. Then, in this position indication mode, the position detection apparatus 201 detects a pointed position by the position pointer 100. Further, in order to make it possible for the position detection apparatus 201 to detect the pointed position by the position pointer 100 and detect an inclination angle of the position pointer 100 with respect to the sensor face of the sensor of the position detection apparatus 201, the controller 11 always outputs an AC signal generated by the signal generation circuit 12 from the center electrode 5 and outputs a signal Sc intermittently to the peripheral electrode 6 through the switch circuit 13 (refer to FIGS. 5B to 5E).

It is to be noted that, in the position indication mode, the controller 11 controls the DC/DC converter 15 to set the voltage VP, for example, to 9 V so that the signal Sc from the signal generation circuit 12 has the second signal level GN2 which is lower than the first signal level GN1. Even if the signal level of the signal Sc becomes such a low second signal level GN2, since the position pointer 100 which is in the position indication mode contacts with or is sufficiently close to the sensor face of the position detection apparatus 201. Accordingly, the position detection apparatus 201 can receive the outputted signal from the position pointer 100 with a high sensitivity and a high efficiency.

In the present embodiment, in the position indication mode, the controller 11 successively changes over a period TA within which a signal is outputted only from the center electrode 5 and a period TB within which a signal Sc is outputted from the center electrode 5 and the peripheral electrode 6 as depicted in FIGS. 5B and 6C. Then, the controller 11 defines a period T (refer to FIG. 6C) of the sum of the period TA and the period TB as one cycle and controls the switch circuit 13 and the switch circuit 14 so as to repeat the period T.

In particular, the controller 11 controls the switch circuit 13 and the switch circuit 14 such that, in order to output the signal Sc only from the center electrode 5, within the period TA (refer to FIG. 6D), the switch circuit 13 is turned off by the changeover controlling signal SW1 while the switch circuit 14 is turned on (refer to FIG. 6E).

Further, the controller 11 controls the switch circuit 13 and the switch circuit 14 such that, within the period TB, the switch circuit 13 is turned on and the switch circuit 14 is turned off by the changeover controlling signals SW1 and SW2, respectively, as depicted in FIGS. 6D and 6E.

Further, in the present embodiment, the controller 11 controls the signal generation circuit 12 such that, within each of the period TA and the period TB, identification information for identifying a transmission period of the signal Sc only from the center electrode 5 and a transmission period from both of the center electrode 5 and the peripheral electrode 6 from each other is added to the AC signal from the oscillation circuit. Further, in the present embodiment, within the period TA, the controller 11 detects tool force applied to the center electrode 5 configuring the core member on the basis of the capacitance of the variable capacitor 4C which configures the tool force detection module 4, and controls the signal generation circuit 12 such that also information of the detected tool force (tool force data) is added to the AC signal from the oscillation circuit. Accordingly, in the present first embodiment, the period TA is longer in period length than the other period TB.

Processing operation by the controller 11 within the periods TA and TB at this time is described with reference to the timing charts of FIGS. 5A to 6E.

In particular, within the period TA, as depicted in FIGS. 5D and 5E, the controller 11 first turns off the switch circuit 13 and turns on the switch circuit 14 so that only the center electrode 5 is placed into a selected state. Then, in this selection state, the controller 11 places the control signal CT into a state in which it retains a high level for a fixed period of time as depicted in FIG. 5C to control the signal generation circuit 12 to continuously output the AC signal from the oscillation circuit configuring the signal generation circuit 12 for a fixed period of time. Consequently, within this period TA, the center electrode 5 is placed into a state in which a burst signal in which the AC signal of the predetermined frequency f1 is outputted continuously for a fixed period of time (refer to the burst signal transmission period (A) of FIG. 5E).

Within the burst signal transmission period (A) within the period TA, the controller 11 controls the terminal Pc to which the variable capacitor 4C depicted in FIG. 3 is coupled to determine tool force applied to the variable capacitor 4C configuring the tool force detection module 4. In particular, the controller 11 charges the variable capacitor 4C by controlling the terminal Pc to the high level. Then, the controller 11 changes over the terminal Pc to an input state. At this time, the charge accumulated in the variable capacitor 4C is discharged by a resistor R coupled in parallel to the variable capacitor 4C. Consequently, the voltage Ec (refer to FIG. 5D) of the variable capacitor 4C gradually drops. The controller 11 determines a time period Tp after the terminal Pc is changed over to the input state until the voltage Ec of the variable capacitor 4C drops to a level lower than a threshold voltage determined in advance. The time period Tp corresponds to the tool force to be determined, and the controller 11 determines the tool force as a value of a plurality of bits, for example, of ten bits from the time period Tp.

Then, within the period TA, when the burst signal transmission period (A) comes to an end, the controller 11 sets the control signal CT (refer to FIG. 5C) to the high level or the low level in a predetermined period Td to control the signal generation circuit 12 to carry out ASK modulation of the AC signal from the oscillation circuit. At this time, the controller 11 sets, in the first cycle, the control signal CT to the high level and outputs the signal for a fixed period of time (refer to the start signal of FIG. 5E). This start signal plays a role as a synchronizing signal for making it possible to accurately decide later data outputting timings on the position detection apparatus 201 side. In particular, the start signal is provided in order to synchronize a signal process such as ASK demodulation by the position detection apparatus 201 with a signal outputting timing of the start signal from the position pointer 100 received by the position detection apparatus 201. The position detection apparatus 201 can utilize the start signal to establish synchronism of a signal process such as ASK demodulation of the signal received from the position pointer 100.

It is to be noted that also it is possible to utilize a burst signal within the burst signal transmission period (A) and another burst signal transmission period (B) hereinafter described as an outputting timing of a signal to be outputted from the position pointer 100, namely, as a synchronizing signal to establish synchronism of signal processing by the position detection apparatus 201.

A period of 2Td following the start signal is an outputting period of identification information for identifying an electrode from which the signal Sc from the position pointer 100 is to be outputted. In particular, since the period TA is an outputting period within which the signal Sc is outputted only from the center electrode 5, the controller 11 controls the control signal CT so that, within the outputting period of identification information within the period TA, in the present example, a code "00" is provided as identification signal of two bits to the center electrode 5, in this example as shown in FIG. 5E.

Following the identification information of the center electrode 5, the controller 11 successively transmits tool force data, for example, of ten bits determined by the operation described hereinabove. In particular, when the transmission data is "0," the controller 11 sets the control signal CT (refer to FIG. 5C) to the low level to control the signal generation circuit 12 to stop generation of the AC signal from the oscillation circuit configuring the signal generation circuit 12. Then, when the transmission data is "1," the controller 11 sets the control signal CT (refer to FIG. 5C) to the high level to control the signal generation circuit 12 to generate the AC signal from the oscillation circuit of the signal generation circuit 12. The controller 11 carries out ASK modulation by the control described above (refer to the tool force data transmission period of FIG. 5E). In FIG. 5C, it is exemplified that the tool force to be transmitted is "0101110101."

After the transmission of the tool data of ten bits ends, the controller 11 carries out changeover control in accordance with the changeover controlling signals SW1 and SW2 so that, in order to end the period TA within which the signal Sc is outputted only to the center electrode 5 and perform changeover to the period TB within which the signal Sc is to be supplied to both of the center electrode 5 and the peripheral electrode 6, the switch circuit 13 is turned on and the switch circuit 14 is turned off (refer to FIGS. 6D and 6E).

Then, if the period TB within which the signal Sc is to be supplied to both of the center electrode 5 and the peripheral electrode 6 is entered, then the controller 11 similarly controls the control signal CT so as to maintain the high level for a fixed period of time as depicted in FIG. 5C similarly as in the period TA. Consequently, the AC signal from the oscillation circuit of the signal generation circuit 12 is outputted as the signal Sc continuously for the fixed period of time. As a result, the center electrode 5 and the peripheral electrode 6 are placed into a state in which a burst signal is outputted continuously therefrom for the fixed period of time (refer to the burst signal transmission period (B) of FIG. 5E).

Since the period TB is an outputting interval within which the signal Sc is outputted not only from the center electrode 5 but also from the peripheral electrode 6, if this burst signal transmission period (B) comes to an end, then the controller 11 sets the control signal CT (refer to FIG. 5C) to the high level to output a start signal and then adds identification information of two bits indicating that the signal Sc is outputted from the center electrode 5 and the peripheral electrode 6. In the present example, the controller 11 controls the control signal CT so as to add "10." As described hereinabove, within the period TB, no tool force detection operation is carried out and no tool force data is transmitted either. It is to be noted that, also within the period TB within which the signal Sc is supplied to both of the center electrode 5 and the peripheral electrode 6, naturally tool force operation may be carried out to transmit tool force data.

If the outputting of identification information comes to an end within the period TB, then in order to end the period TB to carry out changeover control to restore the period TA, the controller 11 controls the switch circuit 13 to off and controls the switch circuit 14 to on with the changeover controlling signals SW1 and SW2, respectively.

Similarly, in the position indication mode at step S106 thereafter, the controller 11 controls for successively and cyclically carrying out changeover between the period TA and the period TB.

Subsequently to step S106, the controller 11 decides whether or not wireless communication is possible through the wireless communication module 22 (step S107). If wireless communication is possible, then the controller 11 monitors the signal from the position detection apparatus 201 received by the wireless communication module 22 to decide whether or not a signal for setting instruction of the hover mode (changing instruction to the hover mode) is received from the position detection apparatus 201 (step S108). If it is decided at step S108 that an instruction for the hover mode is not received, then the controller 11 returns the processing to step S106 to repeat the process at step S106.

Then, if it is decided at step S108 that an instruction for the hover mode is received, then the controller 11 returns the processing to step S104 to execute processing in the hover mode. Thereafter, the processes at the steps beginning with step S104 are repeated.

Then, if it is decided at step S102 that wireless communication is not possible through the wireless communication module 22, then the controller 11 advances the processing to step S103 to repeat the processes beginning with step S103.

<Example of Configuration of Position Detection Apparatus 201>

Now, an example of a configuration of the position detection apparatus 201 of the first embodiment used together with the position pointer 100 described above is described.

Figure 7:
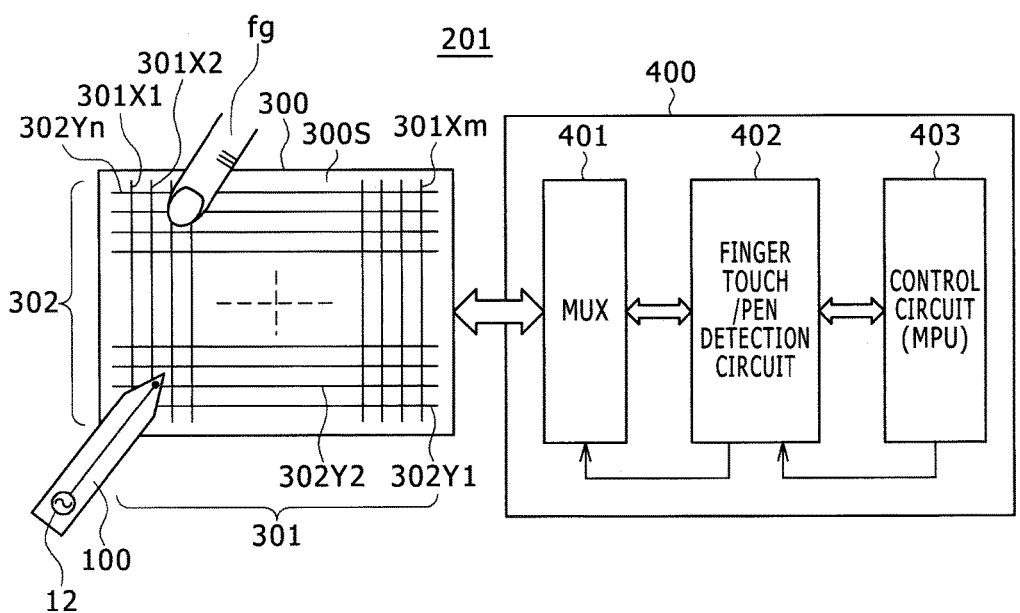
FIG. 7 is a block diagram depicting a general configuration of the position detection apparatus used together with the position pointer of the embodiment of the present disclosure.

FIG. 7 depicts an example of a general configuration of the position detection apparatus 201 of the present embodiment. The position detection apparatus 201 of the present example has a configuration of a position detection apparatus of the capacitive type and includes a sensor of a cross point (mutual capacitance) configuration. In particular, the position detection apparatus 201 is configured such that, when capacitive touch of a finger or the like, particularly multi-touch, is to be detected, a transmission signal is supplied to a conductor disposed in a first direction and a signal is received from another conductor disposed in a second direction different from the first direction. Further, where a pointer is an active capacitive pen which includes an electric circuit for outputting a position indication signal and a driving power supply for driving the electric circuit like the position pointer 100 described hereinabove, the position detection apparatus 201 is configured such that a signal is received from each of conductors disposed in a first direction and a second direction. It is to be noted that a process and so forth of a position detection apparatus of the cross point capacitive type is disclosed in details in Japanese Patent Laid-open Nos. 2011-3035, 2011-3036, 2012-123599 and so forth which are publication of unexamined applications filed by the assignee of the present patent application.

The position detection apparatus 201 of the present embodiment is configured from a sensor 300 which configures a touch panel (position detection sensor) and a controlling apparatus unit 400 as depicted in FIG. 7.

The sensor 300 in the present example is formed by stacking a Y conductor group 302, an insulating layer and an X conductor group 301 in order from the lower face side. The X conductor group 301 and the Y conductor group 302 provide a grid configuration in which they cross orthogonally with each other. The Y conductor group 302 includes a plurality of Y conductors 302Y1, 302Y2, . . . , 302Yn (n is an integer greater than 1) extending, for example, in the horizontal direction (X-direction) and spaced by a predetermined distance from each other as depicted in FIGS. 7 and 9. Meanwhile, the X conductor group 301 includes a plurality of X conductors 301X1, 301X2, . . . , 301Xm (m is an integer greater than 1) extending in the orthogonal vertical direction (Y-axis direction) and spaced by a predetermined distance from each other.

In the sensor 300 of the present embodiment, the plurality of X conductors 301X1, 301X2, . . . , 301Xm configuring the X conductor group 301 are first conductors and the plurality of Y conductors 302Y1, 302Y2, . . . , 302Yn configuring the Y conductor group 302 are second conductors. In this manner, the position detection apparatus 201 is configured such that a sensor pattern formed from the X conductors and the Y conductors crossing with each other is used to detect a position pointed to by a pointer such as the position pointer 100 configured from a finger fg or the position pointer 100 which configures the active capacitive pen.

The position detection apparatus 201 of the present embodiment is incorporated in and used together with an electronic apparatus such as, for example, a portable apparatus called a smartphone. Therefore, the sensor 300 has a size corresponding to the magnitude of the display screen provided on the electronic apparatus. An instruction inputting face (sensor face) 300S having a screen size around 4 inches is formed from the X conductor group 301 and the Y conductor group 302 both having an optical transparency.

It is to be noted that the X conductor group 301 and the Y conductor group 302 may be configured so as to be disposed on one face side of a sensor substrate or may be configured otherwise such that the X conductor group 301 is disposed on one face side of a sensor substrate while the Y conductor group 302 is provided on the other face side of the sensor substrate.

The controlling apparatus unit 400 is configured from a multiplexer 401 serving as an input/output interface with the sensor 300, a finger touch/pen detection circuit 402, and a control circuit 403.

Figure 8:
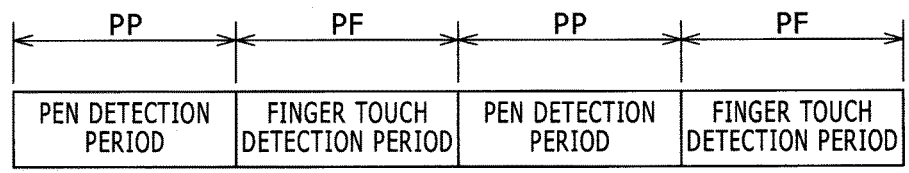
FIG. 8 is a view illustrating a pen detection period and a finger touch detection period of the position detection apparatus depicted in FIG. 7.

The control circuit 403 controls operation of the entire position detection apparatus 201 and is configured, in the present example, with a microprocessor unit (MPU). The position detection apparatus 201 of the present embodiment controls such that detection of a finger touch and detection of a pen touch by the position pointer 100 or the like are carried out time-divisionally. In particular, in the position detection apparatus 201 of the present embodiment, operation within a pen detection period PP within which detection of pen touch is executed and operation within a finger touch detection period PP within which detection of finger touch is executed are executed time-divisionally as depicted in FIG. 8.

The control circuit 403 carries out changeover control of the multiplexer 401 and the finger touch/pen detection circuit 402 within the finger touch detection period PP and the pen detection period PP.

Within the finger touch detection period, the capacitance at each of crossing points of the sensor pattern of the sensor 300 of the grid configuration formed from the X conductors and the Y conductors crossing with each other varies at a position touched by a finger. Therefore, the controlling apparatus unit 400 detects the position touched by the finger by detecting the variation of the capacitance.

Further, within the pen detection period PP, the controlling apparatus unit 400 detects the signal Sc outputted from the position pointer 100 by the sensor 300. Further, the controlling apparatus unit 400 decides, based on the reception information of the signal Sc from the position pointer 100, whether or not the position pointer 100 is positioned at a position spaced by more than a certain distance from the sensor face 300S of the sensor 300, for example, whether or not the position pointer 100 is in the hover state in which it is spaced, for example, by more than 1 cm or is in a state in which it is positioned closely within a distance smaller than 1 cm from the sensor face 300S of the sensor 300. Then, the controlling apparatus unit 400 generates a mode instruction signal for the position pointer 100 on the basis of the result of the decision and transmits the mode instruction signal to the position pointer 100 through the wireless communication circuit.

If the position pointer 100 is in the state in which it is positioned closely within a distance, for example, smaller than 1 cm from the sensor face 300S of the sensor 300, then the position detection apparatus 201 receives the signal Sc from the position pointer 100 not only at the X conductor group 301 (first conductors; X conductors) of the sensor 300 but also at the Y conductor group 302 (second conductors; Y conductors). Then, the controlling apparatus unit 400 measures the level of the signal Sc outputted from the position pointer 100 for each of the conductors configuring the first conductor group and the second conductor group. Then, the controlling apparatus unit 400 specifies a first conductor and a second conductor whose reception signals exhibit the high level to detect the pointed position on the sensor 300 by the position pointer 100.

On the other hand, when the sensor 300 is in a state in which it contacts with the sensor face 300S, the position detection apparatus 201 detects the pointed position on the sensor 300 by the position pointer 100. Further, the position detection apparatus 201 receives data corresponding to the tool force applied to the center electrode 5 of the position pointer 100 to detect the tool force and detect an inclination angle of the position pointer 100 with respect to the sensor face 300S of the sensor 300.

<Example of Configuration of Controlling Apparatus Unit 400 of Position Detection Apparatus 201>

FIG. 9 depicts an example of a configuration of the controlling apparatus unit 400 of the position detection apparatus 201 and particularly depicts a portion of the configuration associated with a pen detection circuit 402P. Accordingly, the circuit of the configuration example of FIG. 9 operates within a pen detection period PP. The pen detection circuit 402P configures a first embodiment of a signal processing apparatus.

Referring to FIG. 9, the pen detection circuit 402P of the present example includes a conductor selection circuit 411 provided for the sensor 300, an amplification circuit 412, a band-pass filter 413, a detection circuit 414, a sample hold circuit 415, and an analog to digital conversion circuit (hereinafter referred to as AD conversion circuit) 416. The pen detection circuit 402P further includes the control circuit 403 described hereinabove.

Further, in the pen detection circuit 402P, a wireless communication module 417 which configures a wireless communication circuit is coupled to the control circuit 403. The wireless communication module 417 is provided to carry out wireless communication with the wireless communication module 22 of the position pointer 100, and in the present embodiment, near field communication of the Bluetooth (registered trademark) standard is used.

The conductor selection circuit 411 configures part of the multiplexer 401 described hereinabove. The amplification circuit 412, band-pass filter 413, detection circuit 414, sample hold circuit 415 and AD conversion circuit 416 configure part of a pen detection circuit in the finger touch/pen detection circuit 402 described hereinabove.

The conductor selection circuit 411 selects one conductor from among the first conductors 301X1 to 301Xm and selects one conductor from among the second conductors 302Y1 to 302Yn in accordance with a control signal CM from the control circuit 403. The conductors selected by the conductor selection circuit 411 are selectively coupled to the amplification circuit 412, and a signal from the position pointer 100 is amplified by the amplification circuit 412. An output of the amplification circuit 412 is supplied to the band-pass filter 413, by which only a frequency component of the signal outputted from the position pointer 100 is extracted from the output of the amplification circuit 412.

An output signal of the band-pass filter 413 is detected by the detection circuit 414. An output signal of the detection circuit 414 is supplied to the sample hold circuit 415, and it is sample-held at a predetermined timing in accordance with a sampling signal from the control circuit 403 by the sample hold circuit 415 and is converted into a digital value by the AD conversion circuit 416. Digital data from the AD conversion circuit 416 is read by the control circuit 403 and is processed by a program stored in a read-only memory (ROM) in the control circuit 403.

In particular, the control circuit 403 operates so as to output control signals to the sample hold circuit 415, AD conversion circuit 416 and conductor selection circuit 411. Then, the control circuit 403 carries out, from the digital data from the AD conversion circuit 416, detection of a hover state of the position pointer 100, detection of position coordinates pointed to on the sensor 300 by the position pointer 100 and signal processing for detection of an inclination angle of the position pointer 100 with respect to the sensor face 300S of the sensor 300.

Now, a detection process of a hover state of the position pointer 100 by the control circuit 403 is described.

As described hereinabove, in the hover state, the position pointer 100 intermittently outputs a signal Sc of a relatively high signal level from both of the center electrode 5 and the peripheral electrode 6. Then, in the detection process of the hover state by the position detection apparatus 201, the sensor 300 receives a signal outputted from the position pointer 100, and the control circuit 403 decides a reception state of the signals from the center electrode 5 and the peripheral electrode 6 of the position pointer 100 by the sensor face 300S to decide whether or not the position pointer 100 is in a hover state in which it is within a predetermined distance (height) close to the sensor face 300S. In the present example, the predetermined close distance represents that the distance between the sensor face 300S and the tip end 5a of the center electrode 5 of the position pointer 100 is, for example, within 1 cm as described hereinabove.

In the present embodiment, the control circuit 403 includes, as software processing functions by a software program for a detection process of a hover state, an object region detection circuit 4031, an object region appearance state decision circuit 4032 and a decision result indication circuit 4033 as depicted in FIG. 9.

Here, the object region is a sensitive region formed on the sensor 300 from signals outputted from the center electrode 5 and the peripheral electrode 6. In the description given below, for the simplified description, object regions formed on the sensor 300 from signals outputted from the center electrode 5 and the peripheral electrode 6 are individually referred to as object region of the center electrode 5 and object region of the peripheral electrode 6, respectively.

FIGS. 10A to 10C are views depicting a variation of an appearance state of an object region on the sensor depending upon a difference in distance of the center electrode 5 configuring the core member of the position pointer 100 from the sensor face 300S, for the convenience of description, in a state in which the position pointer 100 is erected uprightly with respect to the sensor face 300S. At a left side portion of each of FIGS. 10A to 10C, the distance (height) of the tip end 5a of the center electrode 5 of the position pointer 100 from the sensor face 300S is indicated; at a central portion, an appearance state of an object region formed on the sensor face 300S at the time is indicated; and at a right side portion, the signal level from a conductor of the sensor 300 detected by the control circuit 403 at the time is indicated. It is to be noted that, in FIGS. 10A to 10C, the signal level indicates a variation in the X axis direction at a particular Y coordinate position Y1 of the sensor face 300S.

FIG. 10A illustrates a state in which the tip end 5a of the center electrode 5 of the position pointer 100 is positioned at the height h1 spaced comparatively far away from the sensor face 300S (third hover state), for example, it is spaced by more than 5 cm. In this state, an object region OB1 in which object regions of the center electrode 5 and the peripheral electrode 6 substantially coincide generally with each other without being separated from each other is formed on the sensor face 300S. The signal levels from the conductors of the sensor 300 detected by the control circuit 403 at this time are in a generally low state.

FIG. 10B illustrates a state in which the height of the tip end 5a of the center electrode 5 of the position pointer 100 from the sensor face 300S is a height h2 which is smaller than the height h1 but is greater than a height h3 (for example, 2 cm) in a close state (second hover state). Also at this time, an object region OB2 in which object regions of the center electrode 5 and the peripheral electrode 6 generally form one region without being separated from each other is formed on the sensor face 300S. However, at this time, the center electrode 5 and the peripheral electrode 6 are sometimes identifiable from each other depending upon the signal levels from the conductors of the sensor 300 detected by the control circuit 403.

FIG. 10C illustrates a state in which the tip end 5a of the center electrode 5 of the position pointer 100 from the sensor 300 is positioned at a position within the height h3 (for example, 1 cm) in a close state in which the height is smaller than the height h2 (first hover state). At this time, an object region OBa of the center electrode 5 and an object region OBb of the peripheral electrode 6 are formed in a separate relationship from each other. The signal levels from the conductors of the sensor 300 detected by the control circuit 403 at this time correspond to those in the object regions OBa and OBb.

Figure 11A:
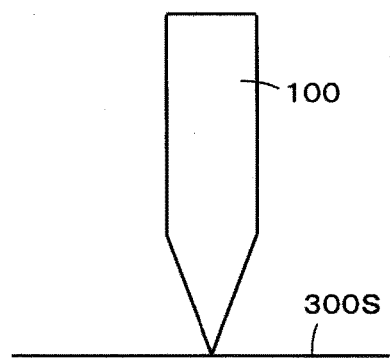
FIGS. 11A to 11D are schematic views illustrating processing operation of the major part of the signal processing apparatus used together with the position pointer depicted in FIGS. 2A and 2B.
Figure 11B:
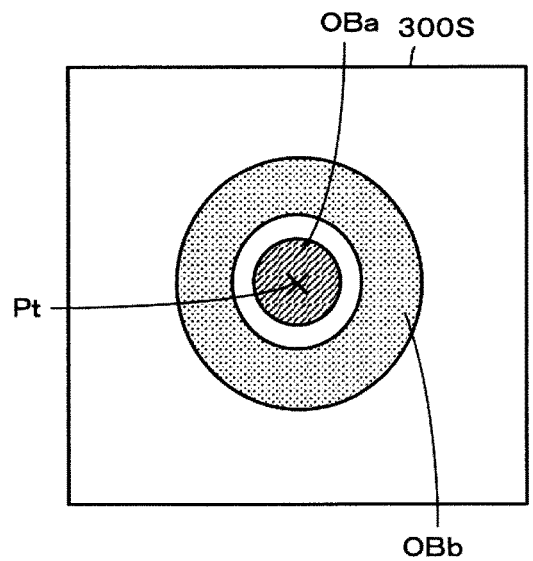
Figure 11C:
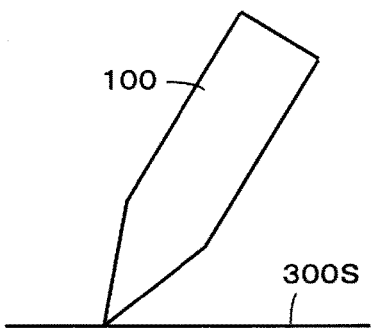
Figure 11D:
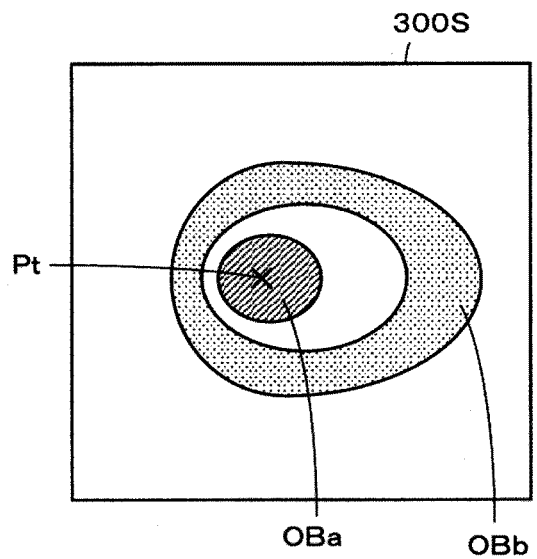

It is to be noted that, when the position pointer 100 is not positioned uprightly but is inclined by a predetermined angle with respect to the sensor face 300S, part of the object region OBb formed corresponding to the peripheral electrode 6 sometimes overlaps with the object region OBa of the center electrode 5, at least in the direction of the inclination, the object region OBb of the peripheral electrode 6 does not overlap with the object region OBa of the center electrode 5 but is separated from the latter (refer to FIG. 11D).

In the present embodiment, the control circuit 403 decides that the position pointer 100 is in a close state to the sensor face 300S when the object region OBa corresponding to the center electrode 5 does not overlap with at least part of the object region OBb of the peripheral electrode 6 but is separate from the latter as depicted in FIG. 10C.

It is to be noted that the control circuit 403 may not decide that the position pointer 100 is placed in a close state to the sensor face 300S based on the fact that the object region OBa of the center electrode 5 does not overlap with at least part of the object region OBb of the peripheral electrode 6 but is placed in a separate state from the object region OBb. Instead, the control circuit 403 may decide that the position pointer 100 is placed in a close state to the sensor face 300S when it additionally detects that the signal level obtained from the object region OBa of the center electrode 5 is equal to or higher than a predetermined threshold level Lth. In this case, the setting of the height h3 of the tip end 5a of the center electrode 5 of the position pointer 100 to be detected as a close state can be changed by changing the threshold level Lth.

In the control circuit 403, the object region detection circuit 4031 carries out detection of object regions formed from signals outputted from the position pointer 100. Then, the object region appearance state decision circuit 4032 checks which one of the states of FIGS. 10A to 10C the appearance state of the detected object regions is and decides whether or not the detected object regions indicate the appearance state of FIG. 10C. Then, the object region appearance state decision circuit 4032 passes a result of the decision to the decision result indication circuit 4033. The decision result indication circuit 4033 transmits instruction information for the hover mode or the position indication mode to the position pointer 100 through the wireless communication module 417 in response to the received decision result.

It is to be noted that, as described hereinabove, even if it is decided that a state in which an instruction for the hover mode is transmitted from the position pointer 100 is entered from another state in which an instruction for the position indication mode is issued to the position pointer 100, the decision result indication circuit 4033 does not transmit the instruction for the hover mode to the position pointer 100 immediately. In particular, the decision result indication circuit 4033 transmits the instruction for the hover mode to the position pointer 100 when it is decided that the state in which an instruction for the hover mode is transmitted is entered from the state in which an instruction for the position indication mode is issued continues for more than a predetermined period of time, for example, for more than five seconds.

In the following, operation of the pen detection circuit 402P of the position detection apparatus 201 when a pointed position and an inclination angle of the position pointer 100 are detected is described.

The control circuit 403 in the present embodiment includes, as software processing functions by a software program, a pointed position detection circuit 4034 and an inclination angle detection circuit 4035 as depicted in FIG. 9. The pointed position detection circuit 4034 and the inclination angle detection circuit 4035 are controlled so as to operate in a state in which an instruction for the position indication mode is issued to the position pointer 100, namely, when the first hover state in which the position pointer 100 is positioned within the height h3 from the sensor face 300S is detected.

At this time, the position pointer 100 outputs, within the period TA, a signal Sc only from the center electrode 5 but outputs, within the period TA, a signal Sc from both of the center electrode 5 and the peripheral electrode 6 in accordance with a setting instruction for the position indication mode from the position detection apparatus 201 as described hereinabove. Then, on the sensor face 300S of the position detection apparatus 201, the object regions OBa and OBb formed on the basis of the center electrode 5 and the peripheral electrode 6 are in a state in which they can be detected separately as depicted in FIG. 10C.

Then, in the position indication mode, since the signal Sc from the position pointer 100 includes identification information for identifying the electrodes from which the signal Sc is supplied, the control circuit 403 of the pen detection circuit 402P can acquire the reception signals from the object regions OBa and OBb by detecting the identification information. In particular, within the period TA depicted in FIG. 5B, the position pointer 100 outputs such a signal Sc (identification information "00") depicted in FIG. 5E only from the center electrode 5, and consequently, only the object region OBa is detected by the sensor 300. Within the period TB, such a signal Sc (identification information "10") as depicted in FIG. 5E is outputted from both of the center electrode 5 and the peripheral electrode 6, and the object region OBb is detected by the sensor 300 in addition to the object region OBa.

The pointed position detection circuit 4034 of the control circuit 403 detects the position of the center of gravity of the object region OBa of the center electrode 5 as the pointed position on the sensor 300 by the position pointer 100. Here, the position of the center of gravity of the object region OBa is a position calculated using signal levels obtained from a plurality of conductors on the sensor 300 in the object region OBa.

In particular, when the position pointer 100 is positioned perpendicularly to the sensor face 300S as depicted in FIG. 11A, the object region OBa exhibits a perfect circular shape as depicted in FIG. 11B, and the pointed position Pt by the center electrode 5 configuring the core member of the position pointer 100 coincides with the center position of the object region OBa. In contrast, where the position pointer 100 is inclined as depicted in FIG. 11C, the object region OBa on the sensor face 300S indicates an elliptical shape as depicted in FIG. 11D, and the pointed position Pt by the position pointer 100 is displaced from the center position of the object region OBa.

However, the level of the signal obtained on a conductor on the sensor 300 included in the object region OBa is a signal level corresponding to the pointed position by the tip end 5a of the center electrode 5 and is obtained substantially correctly as a position pointed by the position pointer 100.

Then, in the present embodiment, the inclination angle detection circuit 4035 of the control circuit 403 determines an inclination angle of the position pointer 100 from the shapes of and a relationship between the object region OBa corresponding to the center electrode 5 of the position pointer 100 and the object region OBb corresponding to the peripheral electrode 6. In particular, when the position pointer 100 is positioned perpendicularly to the sensor face 300S, the object region OBa has a perfect circular shape, and the object region OBb exhibits a doughnut shape with which the center position thereof coincides with the center position of the object region OBb.

On the other hand, if the position pointer 100 is inclined as depicted in FIG. 11C, then the object region OBa has a major axis in the direction in which the position pointer 100 is inclined as depicted in FIG. 11D and has an elliptical shape whose major axis has a length corresponding to the inclination. Also the object region OBb indicates a doughnut shape extend in the direction in which the position pointer 100 is inclined. Therefore, the inclination of the position pointer 100 can be detected from the shapes of and the relationship between the object region OBa and the object region OBb.

Figure 12:
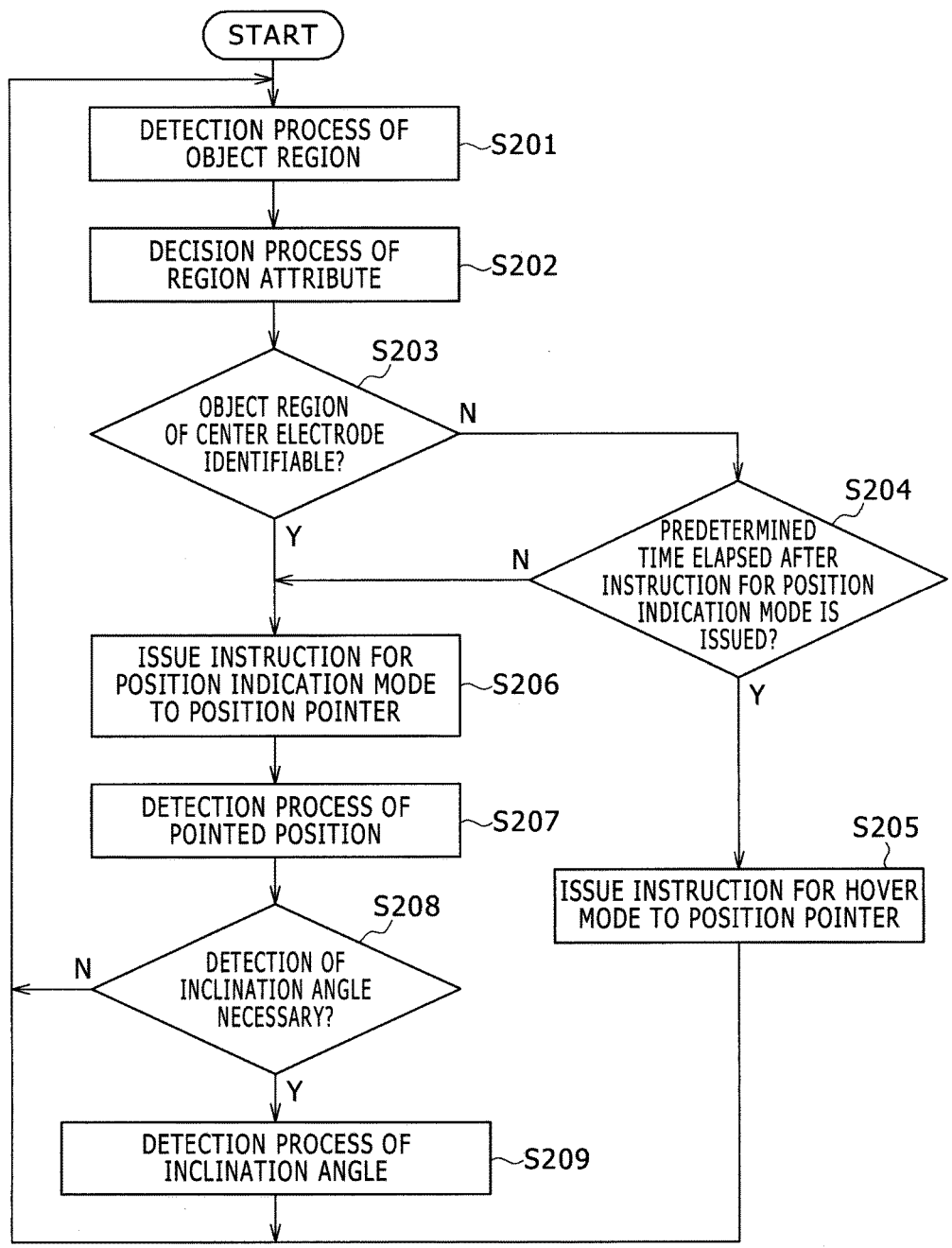
FIG. 12 is a flow chart illustrating a flow of an example of processing operation of the major part of the signal processing apparatus used together with the position pointer depicted in FIG. 1.

Now, an example of a flow of processing for detecting the inclination of the position pointer 100 by the control circuit 403 configured in such a manner as described above is described with reference to a flow chart of FIG. 12.

The control circuit 403 receives a signal Sc from the position pointer 100 through a conductor group of the sensor 300 and executes a detection process of object regions by the function of the object region detection circuit 4031 (step S201).

If the detection process of object regions ends at step S201, then the control circuit 403 checks the appearance state of the object regions on the sensor face 300S by the function of the object region appearance state decision circuit 4032 and decides whether or not the object regions are in a state in which they can be detected separately from each other. If the object regions are in a state in which they can be detected separately from each other, then the control circuit 403 decides a region attribute of each of the object regions in regard to which one of the object regions of the center electrode 5 and the peripheral electrode 6 the object region is (step S202).

Then, the control circuit 403 decides by the function of the object region appearance state decision circuit 4032 whether or not the object region of the center electrode 5 can be identified separately from the object region of the peripheral electrode 6 (step S203).

If it is decided at step S203 that the object region formed from the center electrode 5 cannot be identified separately from the object region formed from the peripheral electrode 6, then the control circuit 403 decides by the function of the object region appearance state decision circuit 4032 thereof whether or not a predetermined period of time, for example, a period of five seconds, elapses after a state in which an instruction for the position indication is transmitted to the position pointer 100 is detected (step S204).

If it is decided at step S204 that the predetermined period of time elapses after the state in which an instruction for the position indication is transmitted to the position pointer 100, then the control circuit 403 transmits, by the decision result indication circuit 4033 thereof, a setting instruction of the hover mode in the form of a wireless signal to the position pointer 100 through the wireless communication module 417 (step S205). Then, the control circuit 403 advances the processing from step S205 to step S201 to repeat the processes at the steps beginning with step S201.

On the other hand, if it is decided at step S203 that the object region formed from the center electrode 5 can be identified separately from the object region formed from the peripheral electrode 6, then the control circuit 403 transmits, using the function of the decision result indication circuit 4033, a setting instruction of the position indication mode in the form of a wireless signal to the position pointer 100 through the wireless communication module 417 (step S206). Also when it is decided at step S204 that the predetermined period of time does not elapse after the state in which an instruction for the position detection mode is outputted is detected, the control circuit 403 advances the processing to step S206. At step S206, the control circuit 403 transmits an instruction for the position indication mode in the form of a wireless signal to the position pointer 100 through the wireless communication module 417.

After the setting instruction for the position indication mode is transmitted to the position pointer 100 at step S206, the control circuit 403 detects, by the function of the pointed position detection circuit 4034 thereof, the position on the sensor 300 pointed to by the position pointer 100 in such a manner as described hereinabove (step S207).

Then, the control circuit 403 decides whether or not the position detection apparatus 201 or an electronic apparatus coupled to the position detection apparatus 201 issues a request for detection of the inclination angle of the position pointer 100 (step S208). If a request for detection of the inclination angle is not issued, then the control circuit 403 returns the processing to step S201 to repeat the processes at the steps beginning with step S201. On the other hand, if it is decided at step S208 that a request for detection of the inclination angle of the position pointer 100 is issued, then the control circuit 403 detects, by the function of the inclination angle detection circuit 4035 thereof, the inclination of the position pointer 100 (step S209). Thereafter, the control circuit 403 returns the processing to step S201 to repeat the processes at the steps beginning with step S201.

It is to be noted that, if a setting instruction for any of the position indication mode and the hover mode is not received from the pen detection circuit 402P of the position detection apparatus 201 depicted in FIG. 9 through the wireless communication module 417, then the position pointer 100 sets the position pointer 100 itself to the hover mode state.

[Effect of First Embodiment]

In the position pointer 100 of the first embodiment described above, in the hover mode, the signal level of the AC signal supplied to the center electrode 5 and the peripheral electrode 6 is set to a signal level higher than that in the position indication mode. Therefore, the hover state of the position pointer 100 above the position detection apparatus 201 can be detected with a high sensitivity. Further, even if the signal level of the AC signal is raised, since the AC signal is outputted intermittently from the position pointer 100, the power consumption can be suppressed.

Further, by outputting an AC signal from both of the center electrode 5 and the peripheral electrode 6, the signal can be outputted efficiently to the sensor 300 of the position detection apparatus 201, and the detection sensitivity of the hover state of the position pointer 100 by the position detection apparatus 201 is improved.

Further, the position detection apparatus 201 identifies on the basis of the signal received from the position pointer 100 whether or not the position pointer 100 is in a predetermined hover state above the sensor face 300S of the sensor 300 of the position detection apparatus 201, and transmits, when the position pointer 100 is in a hover state in which it is sufficiently close to the sensor face 300S of the sensor 300 of the position detection apparatus 201, a setting instruction for the position indication mode to the position pointer 100. Therefore, the position detection apparatus 201 is allowed to detect the pointed position from a state in which the position pointer 100 is in a hover state in which it does not contact with the sensor face 300S and can detect the inclination angle of the position pointer 100 as occasion demands.

[Modifications to First Embodiment]

It is to be noted that, while, in the embodiment described above, the position pointer 100 outputs, in the hover mode, a signal Sc from both of the center electrode 5 and the peripheral electrode 6, it may be configured otherwise such that a signal Sc is outputted only from the peripheral electrode 6.

Further, while, in the first embodiment described above, a setting instruction for the hover mode and a setting instruction for the position indication mode are transmitted from the pen detection circuit 402P of the position detection apparatus 201 through the wireless communication module 417, the setting instruction for the hover mode may not be outputted. In this case, in response to detection of the fact that the position pointer 100 comes close to a position at a predetermined distance (height) from the sensor face 300S, a signal for setting the position pointer 100 to the position indication mode is repetitively issued to the position pointer 100 through the sensor 300, and when the position pointer 100 cannot receive the signal for setting the position indication mode continuously, for example, for five seconds through the sensor 300, the position pointer 100 itself cancels the position indication mode. Further, in response to the fact that it cannot be detected for a predetermined period of time that the position pointer 100 comes close to a position at a predetermined distance (height) with respect to the sensor face 300S, an instruction for setting the position pointer 100 to the hover mode may be transmitted from the pen detection circuit 402P of the position detection apparatus 201 to the position pointer 100 through the wireless communication module 417. If this configuration is employed, then changeover control of the mode can be carried out by issuing an instruction to set only one mode from between the hover mode and the position indication mode.

It is to be noted that the embodiment described is configured such that, in the position indication mode, a signal Sc generated from the signal generation circuit 12 and including identification information of the center electrode 5 and the peripheral electrode 6 is outputted from the position pointer 100 in order to allow identification of a case in which the signal Sc is supplied to the center electrode 5 and another case in which the signal Sc is supplied to both of the center electrode 5 and the peripheral electrode 6. However, the method for identification of the two cases is not limited to the method in which the identification information is included in the signal Sc.

For example, in the embodiment described above, the signal Sc to be supplied only to the center electrode 5 includes tool force data while the signal Sc to be supplied to the center electrode 5 and the peripheral electrode 6 does not include tool force data. Accordingly, when the signal Sc including tool force data is received, the position detection apparatus 201 can identify that the signal Sc is outputted only from the center electrode 5 in the position pointer 100. Further, it can be identified that, within the next period, the signal Sc is outputted from the center electrode 5 and the peripheral electrode 6.

Further, from a similar idea, it can be identified that only the center electrode 5 is selected by the position pointer 100 or that both of the center electrode 5 and the peripheral electrode 6 are selected from a difference between the period length of the period TA within which the signal Sc is outputted only to the center electrode 5 and the period length of the period TB within which the signal Sc is outputted from the center electrode 5 and the peripheral electrode 6.

In addition, a signal rest period of a predetermined length may be provided only next to the period TA within which the signal Sc is outputted only from the center electrode 5 or a predetermined signal which can be identified from any other signal may be inserted in place of a rest period so that the period TA within which the signal Sc is outputted only from the center electrode 5 and the period within which the signal Sc is outputted from the center electrode 5 and the peripheral electrode 6 can be identified from each other.

Further, the oscillation circuit provided in the signal generation circuit 12 may be configured such that it can generate a plurality of signals of different frequencies such that, in the hover mode, a signal of one of the frequencies is supplied to both of the center electrode 5 and the peripheral electrode 6 whereas, in the position indication mode, the signals of the different frequencies are supplied to the center electrode 5 and the peripheral electrode 6 such that the position detection apparatus can identify the center electrode 5 and the peripheral electrode 6 from each other.

Further, in the embodiment described above, the object region appearance state decision circuit 4032 decides, in the detection process of the hover state, the state in which the tip end 5a of the center electrode 5 of the position pointer 100 is positioned closely to the sensor face 300S of the position detection apparatus 201 on the basis of whether or not the center electrode 5 can be identified from the peripheral electrode 6. However, the detection process is not limited to this method, but the object region appearance state decision circuit 4032 may decide the closely positioned state of the tip end 5a of the center electrode 5 of the position pointer 100 to the sensor face 300S of the position detection apparatus 201 on the basis of whether or not the object region of the center electrode 5 and/or the object region of the peripheral electrode 6 have a predetermined magnitude.

Further, while, in the embodiment described above, in the position indication mode, the period TB is provided in order to calculate an inclination angle of the position pointer 100, where there is no necessity to detect the inclination angle, only the period TA may be executed.

Further, in the first embodiment, the position pointer 100 carries out changeover between the hover mode and the position indication mode on the basis of a signal received from the position detection apparatus through the wireless communication module. However, the mode changeover between the hover mode and the position indication mode of the position pointer may not be carried out on the basis of a signal received from the position detection apparatus through the wireless communication module but may be carried out only by the position pointer itself.

In particular, in the first embodiment described above, decision of whether or not the position pointer 100 comes close to a predetermined distance (height) with respect to the sensor face 300S is carried out on the basis of detection of an appearance state of the object regions formed from signals outputted from the position pointer 100 and mode changeover between the hover mode and the position indication mode is carried out on the basis of a result of the detection. In contrast, if a tool force detection result by the tool force detection module 4 as a pressure detection section provided in the position pointer 100 is used, then changeover between the hover mode and the position indication mode can be carried out by the position pointer itself without depending upon a signal from the position detection apparatus. In particular, the position pointer 100 set to the hover mode performs changeover from the hover mode to the position indication mode and outputs a signal in response to a detection by the tool force detection module 4 that the center electrode 5 which is the core member of the position pointer 100 is brought into contact with the sensor face of the position detection apparatus 201 to apply a predetermined pressure (higher than zero or more) to the center electrode 5. Operation except this is such as described above.

Where the configuration just described is adopted, it is detected based on the tool force value detected by the tool force detection module 4 that the center electrode 5 as the core member of the position pointer 100 is brought into contact with the sensor of the position detection apparatus 201, and the mode of the position pointer 100 is changed over from the hover mode to the position indication mode. Therefore, changeover control of the mode which precisely reflects a will of position indication by the user using the position pointer 100 can be carried out.

Second Embodiment

In the first embodiment described above, a setting instruction of the hover mode and a setting instruction of the position indication mode which are decision results from the decision result indication circuit 4033 of the pen detection circuit 402P of the position detection apparatus 201 are transmitted to the position pointer 100 through the wireless communication module 417 and the wireless communication module 22. However, it is possible to otherwise transmit a setting instruction of the hover mode and a setting instruction of the position indication mode from the pen detection circuit 402P of the position detection apparatus 201 from the sensor 300 of the position detection apparatus 201 through the center electrode 5 of the position pointer 100. A second embodiment is an example of the case just described. The position pointer 100A of the second embodiment has a mechanical configuration similar to that of the position pointer 100 of the first embodiment depicted in FIGS. 2A to 3.

Figure 13:
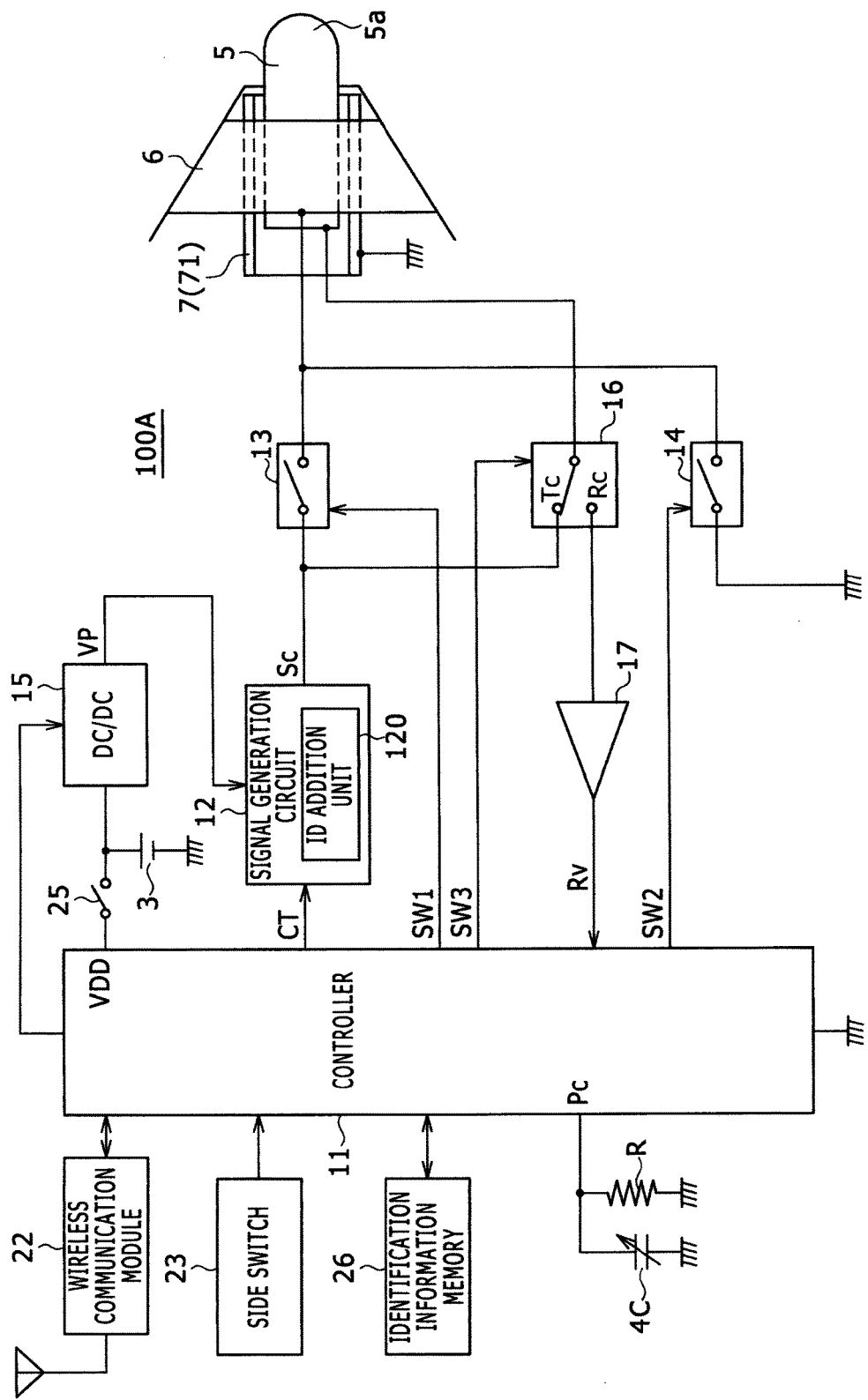
FIG. 13 is a block diagram depicting an example of a configuration of a signal processing circuit of a second embodiment of a position pointer according to the present disclosure.

An example of a configuration of a signal processing circuit of the position pointer 100A of the second embodiment is depicted in FIG. 13. In FIG. 13, like elements to those of the configuration example of the signal processing circuit of the position pointer 100 of the first embodiment described hereinabove with reference to FIG. 3 are denoted by like reference symbols, and overlapping detailed description of them is omitted herein to avoid redundancy.

In the present second embodiment, a changeover switch circuit 16 is provided and is coupled at a common terminal thereof to the center electrode 5 as depicted in FIG. 13. Further, the changeover switch circuit 16 is coupled at a fixed contact terminal Tc thereof to an output terminal of the signal generation circuit 12 whereas the changeover switch circuit 16 is coupled at the other fixed contact terminal Rc thereof to a signal reception terminal Rv of the controller 11 through a reception amplifier 17. The controller 11 supplies a changeover controlling signal SW3 to the changeover switch circuit 16. The other part of the position pointer 100A is configured similarly to that of the position pointer 100 of the first embodiment depicted in FIG. 3. It is to be noted that, in the present second embodiment, the controller 11 transmits identification information of the position pointer 100A and information of the side switch to the position detection apparatus 201 through the wireless communication module 22.

In the position pointer 100A of the present second embodiment, in the hover mode, the controller 11 carries out changeover control in the following manner using the changeover controlling signal SW3. In particular, within an in intermittent transmission period of a burst signal depicted in FIG. 6, the changeover switch circuit 16 is coupled to the fixed contact terminal Tc. On the other hand, immediately after the intermittent transmission of a burst signal, the changeover switch circuit 16 is coupled to the other fixed contact terminal Rc for a period of time sufficient to receive a signal from the sensor 300.

On the other hand, in the position indication mode, the controller 11 carries out changeover control in the following manner using the changeover controlling signal SW3. In particular, at a suitable intermittent timing, for example, immediately after a burst signal transmission period depicted in FIG. 5E, the changeover switch circuit 16 is coupled to the fixed contact terminal Rc for a period of time sufficient to receive a signal from the sensor 300. Within the other period, the changeover switch circuit 16 is coupled to the fixed contact terminal Tc.

On the other hand, the pen detection circuit 402P of the position detection apparatus 201 determines, on the basis of a burst signal received from the position pointer 100A, a point of time at which reception of the burst signal is interrupted as a starting time point. Then, from the starting time point, the pen detection circuit 402P transmits a setting instruction of the hover mode or a setting instruction of the position indication mode from the decision result indication circuit 4033 to the position pointer 100A through the sensor 300.

The controller 11 of the position pointer 100A controls the position pointer 100A to the hover mode state when it receives an instruction for the hover mode from the position detection apparatus 201 and when it fails to receive a signal from the position detection apparatus 201. Then, when an instruction for the position indication mode is received from the position detection apparatus 201, the controller 11 controls the position pointer 100A so as to change over to the position indication mode.

It is to be noted that, in the case of the present second embodiment, the pen detection circuit 402P of the position detection apparatus 201 may not output a setting instruction for the hover mode but may instruct the position pointer 100A in the following manner. In particular, if it is detected that the position pointer 100A comes to a predetermined distance close to the sensor face 300S, then an instruction for setting of the position indication mode is issued to the position pointer 100A through the sensor 300. On the other hand, if it is detected that a state in which it is not detected that the position pointer 100A is positioned at the predetermined distance close to the sensor face 300S continues for a predetermined period of time, for example, for more than five seconds, then a position indication mode cancellation instruction is issued to the position pointer 100A.

In the second embodiment described above, the position pointer 100A carries out changeover between the hover mode and the position indication mode in response to instruction information from the position detection apparatus 201 similarly as in the first embodiment. However, mode changeover may naturally be carried out between the hover mode and the position indication mode in response to the tool force value of the tool force detection module 4.

Third Embodiment

In the embodiments described above, a signal Sc generated by the signal generation circuit 12 is transmitted through the center electrode 5 and the peripheral electrode 6. In a position pointer 100B of a third embodiment, in the position indication mode, a signal from the position detection apparatus 201 is received through capacitive coupling, and the received signal is amplified and so forth and then fed back to the position detection apparatus 201.

Figure 14:
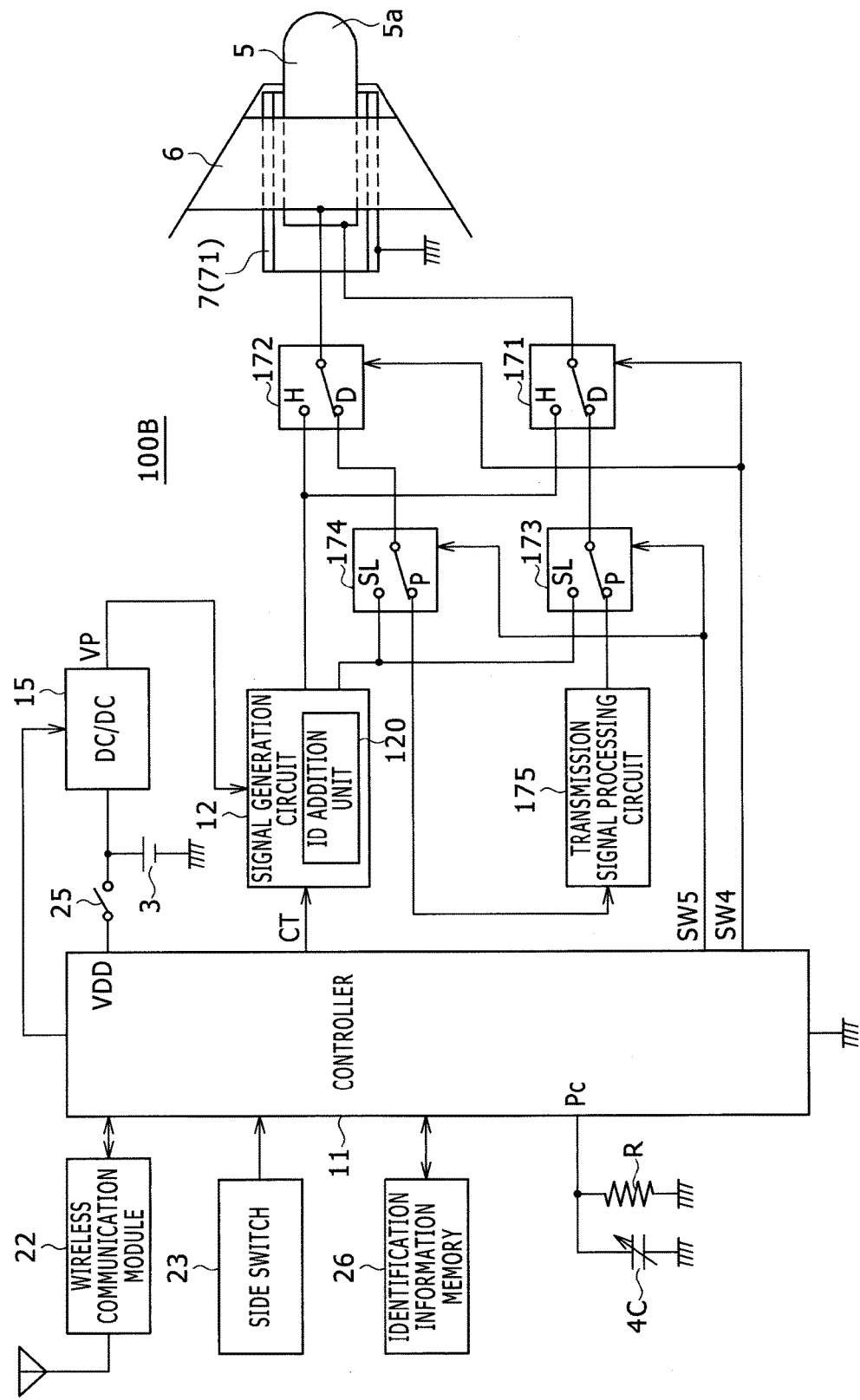
FIG. 14 is a block diagram depicting an example of a configuration of a signal processing circuit of a third embodiment of a position pointer according to the present disclosure.

The position pointer 100B of the present third embodiment has a mechanical configuration similar to that of the position pointer 100 of the first embodiment described hereinabove with reference to FIGS. 2A to 3. The position pointer 100B of the third embodiment is different in configuration of the signal processing circuit from those of the first and second embodiments described hereinabove. FIG. 14 depicts an example of a configuration of the signal processing circuit of the position pointer 100B of the third embodiment. In FIG. 14, like elements to those of the signal processing circuit depicted in FIG. 3 are denoted by like reference symbols.

In the present third embodiment, the signal generation circuit 12 outputs an intermittent signal (burst signal) of a first signal level GN1 depicted in FIGS. 6A and 6B as a signal Sc and outputs the signal Sc from both of the center electrode 5 and the peripheral electrode 6.

Further, in the present third embodiment, the signal generation circuit 12 stops oscillation of the oscillator within the period TA in the position indication mode. Further, within the period TA, the signal generation circuit 12 receives a signal from the sensor of the position detection apparatus 201 using the peripheral electrode 6 and carries out a predetermined signal process for the received signal. Then, the signal generation circuit 12 feeds back the resulting signal to the sensor of the position detection apparatus 201 through the center electrode 5. Here, the predetermined signal process is, in the present example, a signal amplification process. The signal processing process includes not only a process for amplifying a signal received from the sensor to a predetermined signal level but also a process for changing the waveform of the signal received from the sensor or a process for controlling the phase of the input signal.

It is to be noted that, in the present third embodiment, information of the tool force value detected by the tool force detection module 4 is transmitted by wireless transmission to the position detection apparatus 201 through the wireless communication module 22 together with information of the side switch or identification information of the position pointer 100B.

Further, in the present third embodiment, the signal generation circuit 12 outputs, within the period TB in the position indication mode, a signal of a second signal level GN2 as the signal Sc and outputs the signal Sc from both of the center electrode 5 and the peripheral electrode 6. It is to be noted that the signal Sc outputted within the period TB includes identification information similarly as in the embodiments described hereinabove.

In order to achieve the foregoing, in the present third embodiment, the signal processing circuit includes switch circuits 171, 172, 173 and 174 and a transmission signal processing circuit 175 as depicted in FIG. 14.

The switch circuit 171 is coupled at a movable contact terminal thereof to the center electrode 5, at a fixed contact terminal H thereof to an output terminal of the signal generation circuit 12 and at the other fixed contact terminal D thereof to a movable contact terminal of the switch circuit 173. Meanwhile, the switch circuit 172 is coupled at a movable contact terminal thereof to the peripheral electrode 6, at one fixed contact terminal H thereof to an output terminal of the signal generation circuit 12 and at the other fixed contact terminal D thereof to a movable contact terminal of the switch circuit 174.

Further, the switch circuits 173 and 174 are coupled at one fixed contact terminal SL thereof to an output terminal of the signal generation circuit 12. Further, the switch circuit 174 is coupled at the other fixed contact terminal P thereof to an input terminal of the transmission signal processing circuit 175, and the switch circuit 173 is coupled at the other fixed contact terminal P thereof to an output terminal of the transmission signal processing circuit 175.

The switch circuits 171 and 172 are changed over in response to a changeover controlling signal SW4 from the controller 11 such that, in the hover mode, they are coupled to the fixed contact terminal H side, but in the position indication mode, they are coupled to the fixed contact terminal D side. Further, the switch circuits 173 and 174 are changed over in response to a changeover controlling signal SW5 from the controller 11 such that, within the period TA in the position indication mode, they are coupled to the fixed contact terminal P side, but within the period TB, they are coupled to the fixed contact terminal SL side.

Since the position pointer 100B of the third embodiment is configured in such a manner as described above, when it is in the hover mode, the switch circuits 171 and 172 are coupled to the fixed contact terminal H side in accordance with the changeover controlling signal SW4 from the controller 11. Therefore, similarly as in the embodiments described hereinabove, the signal of the first signal level GN1 is intermittently outputted from both of the center electrode 5 and the peripheral electrode 6.

Then, if the position indication mode is entered in accordance with instruction information from the position detection apparatus 201, then in the position pointer 100B, the switch circuits 171 and 172 are coupled to the fixed contact terminal D side in accordance with the changeover controlling signal SW4 from the controller 11. Then, in the position indication mode, within the period TA, the switch circuits 173 and 174 are coupled to the fixed contact terminal P in accordance with the changeover controlling signal SW5 from the controller 11. Therefore, a signal from the sensor of the position detection apparatus 201 received by the peripheral electrode 6 is inputted to the transmission signal processing circuit 175, by which the predetermined signal process described hereinabove is carried out. Then, a signal of a result of the process for the transmission signal processing circuit 175 is transmitted (fed back) to the sensor of the position detection apparatus 201 through the center electrode 5.

Further, within the period TB in the position indication mode, the switch circuits 173 and 174 are coupled to the fixed contact terminal SL in accordance with the changeover controlling signal SW5 from the controller 11. Consequently, a signal of the second signal level GN2 from the signal generation circuit 12 is outputted through the center electrode 5 and the peripheral electrode 6. The position detection apparatus 201 can detect, from the reception signal within the period TB, an inclination angle of the position pointer 100 with respect to the sensor face in a similar manner as described above.

It is to be noted that, in the foregoing description of the third embodiment, within the period TA in the position indication mode, a signal from the sensor of the position detection apparatus 201 is received by the peripheral electrode 6, and the reception signal is processed by the transmission signal processing circuit 175 and then outputted through the center electrode 5 so as to be fed back to the sensor. However, a signal from the sensor of the position detection apparatus 201 may be received by the center electrode 5, and the reception signal may be processed by the transmission signal processing circuit 175 and outputted through the peripheral electrode 6 so as to be fed back to the sensor.

Further, in the foregoing description of the third embodiment, the position pointer 100B carries out changeover between the hover mode and the position indication mode in accordance with instruction information from the position detection apparatus 201. However, changeover between the hover mode and the position indication mode may be carried out in response to the tool force value of the tool force detection module 4 as described hereinabove.

Other Embodiments or Modifications

While, in the embodiments described above, in the hover mode, a signal is outputted from both of the central electrode and the peripheral electrode, it may otherwise be outputted only from the peripheral electrode.

Further, while, in the embodiments described above, signals of a same frequency are outputted in the hover mode and the position indication mode, signals of different frequencies may be outputted. Further, within the period TA and within the period TB in the position indication mode, signals of different frequencies may be outputted. In this case, identification information of two bits which is included in a signal in the period TA and the period TB can be omitted.

While preferred embodiments of the present disclosure have been described using specific terms, such description is for illustrative purposes only, and it is to be understood that changes and variations may be made without departing from the spirit or scope of the following claims.

What is claimed is:

1. A position pointer that operates in a first mode and a second mode in which signals are selectively transmitted to a sensor provided in a position detection apparatus, a distance between the position pointer and the sensor in the second mode being shorter than a distance between the position pointer and the sensor in the first mode, comprising:
a first electrode disposed so as to project from one end portion of a pen-shaped housing in an axial direction;

a second electrode disposed in a proximity of the first electrode so as to surround a center axis of the pen-shaped housing;

a signal generation circuit which, in operation, generates the signals selectively transmitted to the sensor provided in the position detection apparatus in the first mode and the second mode;

the signal generated by the signal generation circuit being outputted to the sensor provided in the position detection apparatus;

wherein the signal generation circuit, in operation, generates a signal of a first signal level in the first mode and a signal of a second signal level lower than the first signal level in the second mode, and a signal supply controlling circuit which, in operation, selectively supplies the signal of the first signal level and the signal of the second signal level generated by the signal generation circuit to the second electrode, wherein, when a mode of operation is changed from the second mode to the first mode, the signal supply controlling circuit changes from supplying the signal of the second signal level to the first electrode to supplying the signal of the first signal level to the second electrode.

2. The position pointer according to claim 1, further comprising a pressure detection circuit which, in operation, detects a pressure applied to the first electrode, wherein, the signal supply controlling circuit, in operation, supplies the signal of the first signal level to at least the second electrode based on an output signal from the pressure detection circuit.

3. The position pointer according to claim 2, wherein, when a given pressure is not detected by the pressure detection circuit, the signal supply controlling circuit supplies the signal of the first signal level at least to the second electrode.

4. The position pointer according to claim 1, further comprising a reception circuit which, in operation, receives an instruction signal transmitted from the position detection apparatus, wherein the signal supply control circuit, in operation, supplies the signal of the first signal level to at least the second electrode based on the instruction signal received by the reception circuit.

5. The position pointer according to claim 4, wherein the reception circuit, in operation, receives the instruction signal through capacitive coupling with the sensor provided in the position detection apparatus.

6. The position pointer according to claim 4, wherein the reception circuit, in operation, receives the instruction signal in the form of a wireless signal transmitted from the position detection apparatus.

7. The position pointer according to claim 4, wherein, when the instruction signal is not received by the reception circuit, the signal supply controlling circuit, in operation, supplies the signal of the first signal level to at least the second electrode.

8. The position pointer according to claim 1, wherein the signal of the first signal level supplied to the second electrode through the signal supply controlling circuit is an intermittent signal.

9. The position pointer according to claim 1, wherein the signal supply controlling circuit includes a changeover circuit coupled to the first electrode, wherein the changeover circuit, in operation, selectively supplies the second signal generated by the signal generation circuit and receives a signal supplied from the sensor through capacitive coupling with the sensor of the position detection apparatus.

10. The position pointer according to claim 9, further comprising a sensor signal reception circuit coupled to the first electrode through the changeover circuit, wherein the signal generation circuit, in operation, generates the signal of the second signal level corresponding to the signal received by the sensor signal reception circuit and supplies the generated signal to the second electrode.

11. A signal processing circuit for capacitively detecting a position pointer on a sensor to which the signal processing circuit is coupled, the sensor including a plurality of first conductors disposed in a first direction and a plurality of second conductors disposed in a second direction different from the first direction, the position pointer including a first electrode disposed so as to project from one end portion of a pen-shaped housing in an axial direction and a second electrode disposed so as to surround a center axis of the housing in a proximity of the first electrode, the position pointer including a signal generation circuit which, in operation, generates a signal of a first signal level and a signal of a second signal level lower than the first signal level, a signal supply controlling circuit which, in operation, selectively supplies the signal of the first signal level and the signal of the second signal level both generated by the signal generation circuit to the first electrode and the second electrode, and a reception circuit which, in operation, receives a signal generated by the signal processing circuit, the signal supply controlling circuit being controlled by the signal processing circuit through the reception circuit, the signal processing circuit comprising:

a generation circuit, which in operation, generates a signal that controls the signal supply controlling circuit provided in the position pointer the signal that controls the signal supply controlling circuit causing the position pointer to operate in a first mode and a second mode in which signals are selectively transmitted to the sensor to which the signal processing circuit is coupled, a distance between the position pointer and the sensor in the second mode being shorter than a distance between the position pointer and the sensor in the first mode, wherein, when the signal that controls the signal supply controlling circuit changes a mode of operation of the position pointer from the second mode to the first mode, the signal supply controlling circuit changes from supplying the signal of the second signal level to the first electrode to supplying the signal of the first signal level to the second electrode; and a transmission circuit which, in operation, supplies the signal that controls the signal supply controlling circuit provided in the position pointer through the reception circuit provided in the position pointer.

12. The signal processing circuit according to claim 11, wherein the transmission circuit, in operation, capacitively supplies the signal that controls the signal supply controlling circuit provided in the position pointer in the form of a wireless signal.

13. The signal processing circuit according to claim 11, wherein the transmission circuit, in operation, supplies the signal that controls the signal supply controlling circuit provided in the position pointer in the form of a wireless signal.

14. The signal processing circuit according to claim 11, wherein the second mode is changed to the first mode based on detection of the capacitive coupling between the position pointer and the sensor, and the generation circuit, in operation, generates the signal that controls the signal supply controlling circuit provided in the position pointer based on the detection of the capacitive coupling between the position pointer and the sensor, and the transmission circuit provided in the signal processing circuit and the reception circuit provided on the position pointer, in operation, are capacitively coupled to each other.

15. The signal processing circuit according to claim 14, wherein the transmission circuit provided in the signal processing circuit transmits the signal to the reception circuit provided on the position pointer capacitively or wirelessly.

16. A signal supply controlling method for supplying signals generated by a signal generation circuit to a first electrode and a second electrode of a position pointer that operates in a first mode and a second mode in which signals are selectively transmitted to a sensor provided in a position detection apparatus, a distance between the position pointer and the sensor in the second mode being shorter, than a distance between the position pointer and the sensor in the first mode, the first electrode being disposed so as to project from one end portion of a pen-shaped housing in an axial direction while the second electrode is disposed so as to surround a center axis of the pen-shaped housing in a proximity of the first electrode, the position pointer outputting a selected signal generated by the signal generation circuit to the sensor provided on the position detection apparatus, the method comprising:
  generating a signal of a first level when the position pointer operates in the first mode and a signal of a second signal level lower than the first signal level when the position pointer operates in the second mode;
  selectively supplying the signal of the first signal level and the signal of the second signal level, wherein, when a mode of operating the position pointer is changed from the second mode to the first mode, changing from supplying the signal of the second signal level to the first electrode, to supplying the signal of the first signal level to the second electrode.

17. The signal supply controlling method according to claim 16, wherein the position pointer includes a pressure detection sensor, which in operation, detects a pressure applied to the first electrode and generates corresponding pressure information, the method comprising:
  identifying whether to operate the position pointer in the first mode or the second mode based on the pressure information.

18. The signal supply controlling method according to claim 16, comprising identifying whether to operate the position pointer in the first mode or the second mode based on a received signal supplied from the sensor through capacitive coupling with the sensor of the position detection apparatus.

19. The signal supply controlling method according to claim 16, comprising identifying whether to operate the position pointer in the first mode or the second mode based on a received signal supplied from the sensor of the position detection apparatus wirelessly.

20. A signal processing method for capacitively detecting a position pointer on a sensor, the sensor including a plurality of first conductors disposed in a first direction and a plurality of second conductors disposed in a second direction different from the first direction, the position pointer including a first electrode disposed so as to project from one end portion of a pen-shaped housing in an axial direction and a second electrode disposed so as to surround a center axis of the housing in a proximity of the first electrode, a signal generation circuit, which in operation, generates a signal of a first signal level when the position pointer operates in a first mode and a signal of a second signal level lower than the first signal level when the position pointer operates in a second mode, a distance between the position pointer and the sensor in the second mode being shorter than a distance between the position pointer and the sensor in the first mode, a signal supply controlling circuit, which in operation, selectively supplies the signal of the first signal level and the signal of the second signal level generated, by the signal generation circuit to the first electrode and the second electrode, and a reception circuit, which in operation, receives a signal controlling the signal supply controlling circuit, the method including:
  generating, by the sensor, a signal based on whether the position pointer is operating in the first mode or in the second mode;
  transmitting the generated signal from the sensor to the reception circuit provided in the position pointer; and
  detecting, by the sensor, the signal of the first signal level when the position pointer operates in the first mode and the signal of the second level when the position pointer operates in the second mode, in response to transmitting the generated signal.

21. A position pointer that operates in a first mode and a second mode in which signals are selectively transmitted to a sensor provided in a position detection apparatus, a distance between the position pointer and the sensor in the second mode being shorter than a distance between the position pointer and the sensor in the first mode, comprising:
  a first electrode disposed so as to project from one end portion of a pen-shaped housing in an axial direction;
  a second electrode disposed in a proximity of the first electrode so as to surround a center axis of the pen-shaped housing;
  a signal generation circuit which, in operation, generates the signals selectively transmitted to the sensor provided in the position detection apparatus in the first mode and the second mode;
  the signal generated by the signal generation circuit being outputted to a sensor provided in the position detection apparatus;
  wherein the signal generation circuit, in operation, generates a signal of a first signal level in the first mode and a signal of a second signal level lower than the first signal level in the second mode, and
  a signal supply controlling circuit which, in operation, selectively supplies the signal of the first signal level and the signal of the second signal level generated by the signal generation circuit to the first electrode,
  wherein, when a mode of operation is changed from the first mode to the second mode, the signal supply controlling circuit changes, from supplying the signal of the first signal level to at least one of the first and second electrodes, to supplying the signal of the second signal level to at least the first electrode.

22. The position pointer according to claim 21, further comprising
  a pressure detection circuit which, in operation, detects a pressure applied to the first electrode,
  wherein, the signal supply controlling circuit, in operation, selectively supplies the signal of the first signal level and the signal of the second signal level to the second electrode based on an output signal from the pressure detection circuit.

23. The position pointer according to claim 22, wherein, when a given pressure is not detected by the pressure detection circuit, the signal supply controlling circuit supplies the signal of the first signal level at least to the second electrode.

24. The position pointer according to claim 21, further comprising
a reception circuit which, in operation, receives an instruction signal transmitted from the position detection apparatus,
wherein the signal supply control circuit, in operation, selectively supplies the signal of the first signal level and the signal of the second signal level to the second electrode based on the instruction signal received by the reception circuit.

25. The position pointer according to claim 24, wherein the reception circuit, in operation, receives the instruction signal through capacitive coupling with the sensor provided in the position detection apparatus.

26. The position pointer according to claim 24, wherein the reception circuit, in operation, receives the instruction signal in the form of a wireless signal transmitted from the position detection apparatus.

27. The position pointer according to claim 24, wherein, when the instruction signal is not received by the reception circuit, the signal supply controlling circuit, in operation, supplies the signal of the first signal level to the second electrode.

28. The position pointer according to claim 21, wherein the signal of the first signal level supplied to the second electrode through the signal supply controlling circuit is an intermittent signal.

29. The position pointer according to claim 21, wherein the signal supply controlling circuit includes a changeover circuit coupled to the first electrode, wherein the changeover circuit, in operation, selectively supplies the signal generated by the signal generation circuit and selectively receives a signal supplied from the sensor through capacitive coupling with the sensor of the position detection apparatus.

30. The position pointer according to claim 29, further comprising
a sensor signal reception circuit coupled to the first electrode through the changeover circuit,
wherein the signal generation circuit, in operation, generates the signal of the second signal level corresponding to the signal received by the sensor signal reception circuit and supplies the generated signal to the second electrode.

31. A signal supply controlling method for supplying signals generated by a signal generation circuit to a first electrode and a second electrode of a position pointer that operates in a first mode and a second mode in which signals are selectively transmitted to a sensor provided in a position detection apparatus, a distance between the position pointer and the sensor in the second mode being shorter than a distance between the position pointer and the sensor in the first mode, the first electrode being disposed so as to project from one end portion of a pen-shaped housing in an axial direction while the second electrode is disposed so as to surround a center axis of the pen-shaped housing in a proximity of the first electrode, the position pointer outputting signals generated by the signal generation circuit to the sensor provided on the position detection apparatus, the method comprising:
generating a signal of a first level when the position pointer operates in the first mode and a signal of a second signal level lower than the first signal level when the position pointer operates in the second mode;
selectively supplying the signal of the first signal level and the signal of the second signal level, wherein, when a mode of operating the position pointer is changed from the first mode to the mode second, changing from supplying the first signal level to at least the second electrode, to supplying the signal of the second signal level to the first electrode.

32. The signal supply controlling method according to claim 31, wherein the position pointer includes a pressure detection sensor, which in operation, detects a pressure applied to the first electrode and generates corresponding pressure information, the method comprising:
identifying whether to operate the position pointer in the first mode or the second mode based on the pressure information.

33. The signal supply controlling method according to claim 31, comprising identifying whether to operate the position pointer in the first mode or the second mode based on a received signal supplied from the sensor through capacitive coupling with the sensor of the position detection apparatus.

34. The signal supply controlling method according to claim 31, comprising identifying whether to operate the position pointer in the first mode or the second mode based on a received signal supplied from the sensor of the position detection apparatus wirelessly.

* * * * *

UNITED STATES PATENT AND TRADEMARK OFFICE
CERTIFICATE OF CORRECTION

PATENT NO. : 10,019,082 B2
APPLICATION NO. : 15/016199
DATED : July 10, 2018
INVENTOR(S) : Hiroshi Munakata et al.

Page 1 of 1

It is certified that error appears in the above-identified patent and that said Letters Patent is hereby corrected as shown below:

In the Claims

Column 33, Line 22:
"and the sensor in the second mode being shorter, than a" should read, --and the sensor in the second mode being shorter than a--.

Signed and Sealed this
Thirtieth Day of October, 2018

Andrei Iancu
*Director of the United States Patent and Trademark Office*